US008429397B2

(12) United States Patent
Imai

(10) Patent No.: US 8,429,397 B2
(45) Date of Patent: Apr. 23, 2013

(54) GENERATING AN ENCRYPTION FONT BY CONVERTING CHARACTER CODES AND RECORDING THE ENCRYPTION FONT IN A UNIQUE TAG

(75) Inventor: Satoshi Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 12/475,155

(22) Filed: May 29, 2009

(65) Prior Publication Data

US 2009/0300481 A1 Dec. 3, 2009

(30) Foreign Application Priority Data

Jun. 2, 2008 (JP) ................................ 2008-144641

(51) Int. Cl.
*H04L 29/06* (2006.01)

(52) U.S. Cl.
USPC ............................ 713/150; 715/269; 715/234

(58) Field of Classification Search ........................ None
See application file for complete search history.

(56) References Cited

U.S. PATENT DOCUMENTS

2006/0245806 A1* 11/2006 Furuse et al. .................. 400/62
2008/0028304 A1* 1/2008 Levantovsky et al. ........ 715/269
2008/0301431 A1* 12/2008 Hea .............................. 713/150

FOREIGN PATENT DOCUMENTS

JP 2002-169807 A 6/2002

* cited by examiner

*Primary Examiner* — Stephen Hong
*Assistant Examiner* — Asher Kells
(74) *Attorney, Agent, or Firm* — Canon U.S.A., Inc. IP Division

(57) ABSTRACT

A character string not to be referred to which is included in structured document data is extracted, and an XML generation unit generates a random code table. Then, the XML generation unit generates a conversion font by converting character codes of a font using the table. The character codes of a document are converted in accordance with the table. The XML generation unit embeds the font and the conversion font.

3 Claims, 23 Drawing Sheets

| XML GENERATION COUNTS | ORIGINAL CHARACTERS | CHARACTER CODE | RANDOM CODE (EXAMPLE) | DISPLAY IN GENERAL VIEWERS | DISPLAY IN DEDICATED VIEWERS |
|---|---|---|---|---|---|
| 1 | DEF | 440045004600 | 450046004400 | EFD | DEF |
| 2 | DEF | ↑ | 460044004500 | FDE | DEF |
| 3 | DEF | ↑ | 460045004400 | FED | DEF |
| 4 | DEF | ↑ | 450044004600 | EDF | DEF |

SINCE DIFFERENT RANDOM CODES ARE GENERATED AFTER CONVERSIONS, IT IS DIFFICULT TO ANALYZE XML DOCUMENT AND TO GENERATE FAKE CODE TABLE

FIG. 20

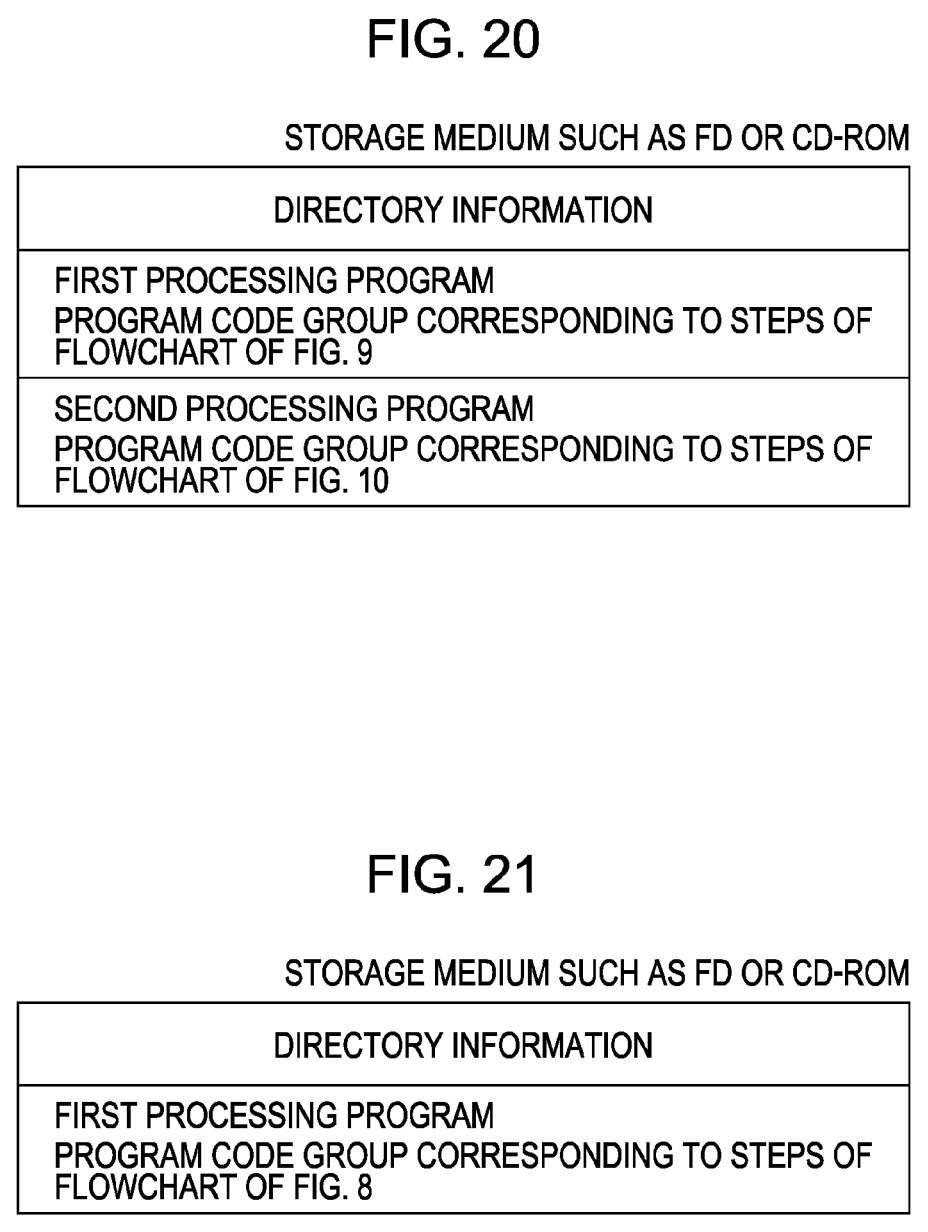

STORAGE MEDIUM SUCH AS FD OR CD-ROM

| |
|---|
| DIRECTORY INFORMATION |
| FIRST PROCESSING PROGRAM<br>PROGRAM CODE GROUP CORRESPONDING TO STEPS OF FLOWCHART OF FIG. 9 |
| SECOND PROCESSING PROGRAM<br>PROGRAM CODE GROUP CORRESPONDING TO STEPS OF FLOWCHART OF FIG. 10 |

FIG. 21

STORAGE MEDIUM SUCH AS FD OR CD-ROM

| |
|---|
| DIRECTORY INFORMATION |
| FIRST PROCESSING PROGRAM<br>PROGRAM CODE GROUP CORRESPONDING TO STEPS OF FLOWCHART OF FIG. 8 |

| CUSTOMER NUMBER | CUSTOMER NAME | ADDRESS | PHONE NUMBER | BIRTH | ..... |
|---|---|---|---|---|---|
| 00000001 | TARO KOSUGI | KANAGAWA-KEN | 044-733...... | 1980....... | |
| 00000002 | HANAKO KOSUGI | | | | |
| 00000003 | ..... | | | | |
| 00000004 | ..... | | | | |

ADDRESSES, PHONE NUMBERS, AND BIRTHDAYS TO BE HIDDEN

GENERATING AN ENCRYPTION FONT BY CONVERTING CHARACTER CODES AND RECORDING THE ENCRYPTION FONT IN A UNIQUE TAG

BACKGROUND OF THE INVENTION

1. Field of the Invention

The present invention relates to data processing in an information processing system including a server apparatus and an information processing apparatus.

2. Description of the Related Art

In general, in an information processing system disclosed in Japanese Patent Laid-Open No. 2002-169807, for example, character information included in an electronic document which is to be electrically transmitted is converted into character information different from the original character information so that confidentiality of the information is protected.

In this case, in processing of converting the character information, a conversion font is generated using a plurality of conversion tables provided in advance, and therefore, an identical font is generated in accordance with the tables every time the conversion processing is performed.

Since the electronic document and the conversion font are included in different files, the information processing system is realized by managing font files for electronic documents in the server apparatus, embedding a communication protocol dedicated for downloading of a font for a client apparatus and a font for the client apparatus, and performing registration of the font for usage.

Furthermore, as a data processing system which includes a server, a client, and a printing terminal, a system in which data to be printed (hereinafter referred to as a "printing data") in accordance with an instruction issued by a user using the client is temporarily stored in the server, and the printing data stored in the server is printed using the printing terminal after the user performs authentication of the printing data using the printing terminal has been proposed.

In such a system, since a format uniquely developed is generally employed in the printing data, it is difficult even for an authorized user who can refer to data stored in the server to recognize content of the printing data.

However, when an XML (Extensible Markup Language), which is a markup language, is employed in the printing data, content of XML data stored in the server can be easily recognized using XML viewers and text editors. Therefore, when personal information or highly-confidential data is to be printed, a problem on security arises.

Furthermore, in a system in which printing data is temporarily stored in a server, in a case where the number of printing and a printing period are set in advance, the printing data can be stored in the server for a long period of time. Therefore, there arises a problem in that it is highly possible that a third party recognizes content of the printing data while the printing data is stored in the server.

FIG. 22 is a diagram illustrating an example of a configuration of a data processing system. In this example, the data processing system includes a server apparatus, a terminal apparatus, and a printing terminal.

In FIG. 22, when a user instructs a printer 107 to print a document 105 (here, the electronic document 105 includes characters "DEF") using a PC 104 connected to a network NET, a printer driver installed in the PC 104 converts the document 105 into an XML document 106 (here, the XML document 106 includes characters "DEF").

Note that, in general, the XML document includes an XPS document developed by Microsoft Corporation.

The XML document 106 obtained through the conversion is temporarily stored as an XML document 103 in a storage device 102 logically connected to a server 101 serving as a printing server.

Normally, such a server 101 is configured such that only an administrator can refer to resources included in the storage device 102, for example, and documents are prevented from being inappropriately referred to by the general public. However, since an inappropriate reference performed by the administrator can not be prevented, characters "DEF" are referred to by the administrator.

The XML document 103 is transmitted through the server 101 to a printer 107 where the XML document 103 is printed.

In a case where the user who operates the printer issues an request for start of printing using the printer 107, the longer a period of time before the user issues the request becomes, the longer a period of time in which data is stored in the storage device 102 of the server 101 becomes. Therefore, it is highly possible that the stored XML document 103 is inappropriately referred to.

As described above, in the case where the XML data is employed as the printing data, a document obtained by merely converting an original document is easily referred to using general XML viewers or general text editors. Accordingly, a problem on security arises.

Referring to FIG. 23, confidentiality of documents and data will be described.

FIG. 23 shows an example of the printing data managed in the data processing system shown in FIG. 22. In this example, a management table of customer data 2301 will be described.

As shown in FIG. 23, the table managing the customer data 2301 generally includes customer numbers, customer names, addresses, phone numbers, and birthdays as needed. In the data included in the table, the addresses, the phone numbers, and the birthdays are highly important as personal information 2302, and therefore, confidentiality of them should be protected as much as possible.

In a case where such personal information is configured in an XPS format, when the personal information 2302 is stored and managed in the storage device 102 shown in FIG. 22 for a predetermined period of time, the administrator can easily refer to and print the personal information. Accordingly, there arises a problem in that the personal information is leaked.

SUMMARY OF THE INVENTION

The present invention provides a system in which a meaningless character string is rendered when a character string included in structured document data is referred to, but a correct character string is rendered when a specific rendering function is used.

According to an aspect of the present invention, a server apparatus includes a first generation unit configured to generate a conversion font by converting certain character codes in a font embedded in a structured document data into random codes using an association table, and an embedding unit configured to embed the conversion font into the structured document data including the character codes so that the conversion font is not processed using a standard viewer.

Further features of the present invention will become apparent from the following description of exemplary embodiments with reference to the attached drawings.

BRIEF DESCRIPTION OF THE DRAWINGS

FIG. 11 is a diagram illustrating examples of random codes generated by the server apparatus according to the exemplary embodiment.

FIG. 20 is a diagram illustrating a memory map of a storage medium which stores various server-readable data processing programs according to the exemplary embodiment.

FIG. 21 is a diagram illustrating a memory map of a storage medium which stores various terminal-readable data processing programs according to the exemplary embodiment.

FIG. 23 is a diagram illustrating an example of printing data managed in the data processing system shown in FIG. 22.

DESCRIPTION OF THE EXEMPLARY EMBODIMENTS

Modes for carrying out the invention will be described hereinafter with reference to the accompanying drawings.

Description of System Configuration

First Exemplary Embodiment

Figure 1A:
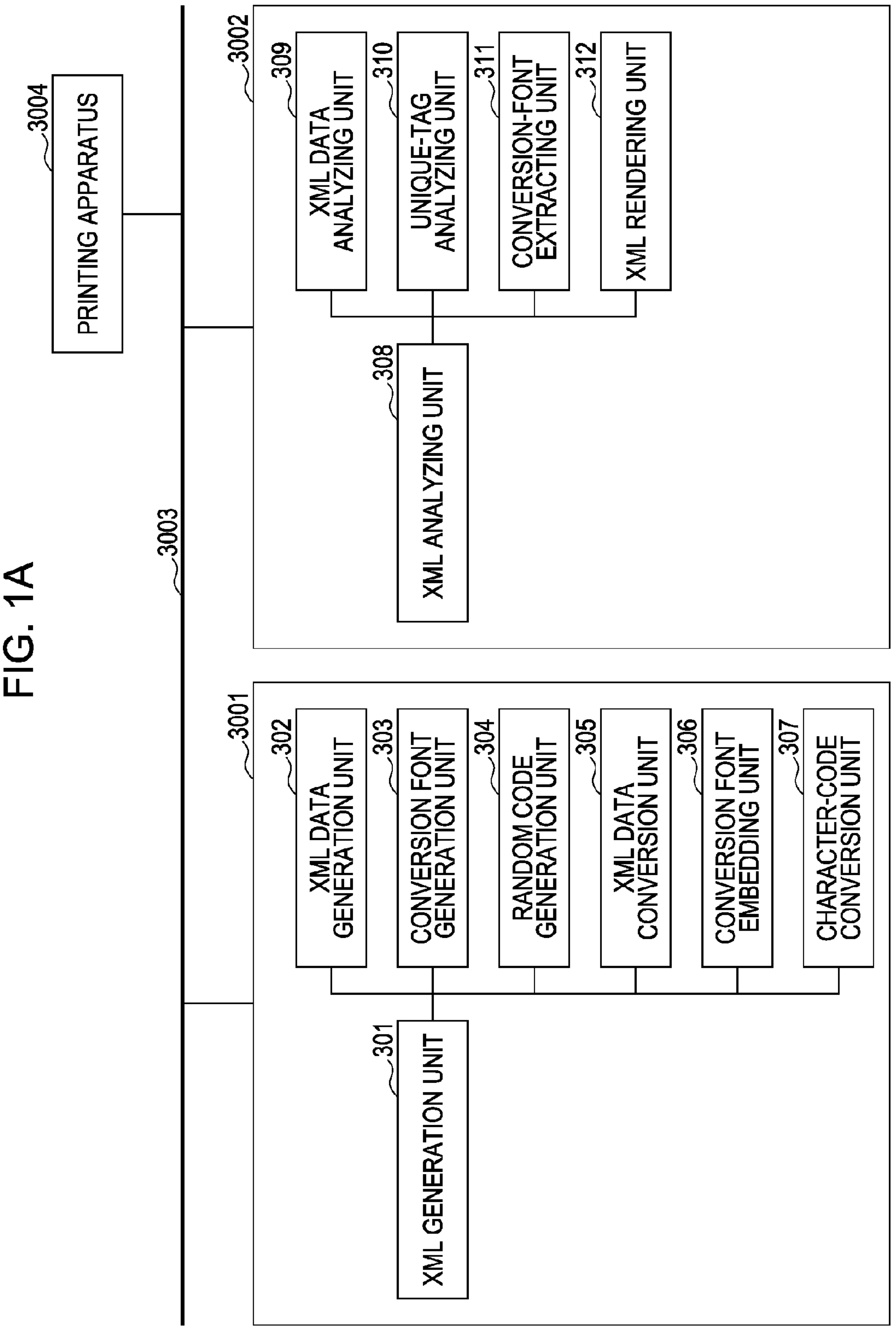
FIG. 1A is a diagram illustrating an example of a data processing system according to an exemplary embodiment of the present invention.

FIG. 1A is a diagram illustrating an example of a data processing system according to a first exemplary embodiment of the present invention. Note that a server apparatus 3001 and a terminal apparatus 3002 included in the data processing system each have hardware resources shown in FIG. 1B. Each of the server apparatus 3001 and the terminal apparatus 3002 realizes character processing of this exemplary embodiment by executing a module loaded into a RAM 203 by a CPU 201. The server apparatus 3001, the terminal apparatus 3002, and a printing apparatus 3004 are connected to one another through a network 3003 for communication. With this configuration, the server apparatus 3001 transmits generated XML data to the terminal apparatus 3002. In this case, transmission processing is started by activating a dedicated driver, and a detailed description thereof will be made hereinafter.

As shown in FIG. 1A, in the data processing system, the server apparatus 3001 includes an XML generation unit 301 as a module, and the terminal apparatus 3002 serving as a printing terminal includes an XML analyzing unit 308 as a module. Here, an information processing apparatus includes the hardware resources and software resources, which will be described hereinafter, and performs character processing in an installed operating system (OS) by executing modules, which will be described hereinafter. Note that the XML generation unit 301 and the XML analyzing unit 308 may be included in an identical information processing apparatus, or may be separately included in respective information processing apparatuses.

The XML generation unit 301 includes an XML data generation unit 302 which analyzes an electronic document generated using an application and converts all rendering information items included in the electronic document into a rendering-information group which constitutes XML data. The XML generation unit 301 further includes a random-code generation unit 304 which generates a table listing rendering-information items (text items) included in characters in the XML data obtained through the conversion.

The XML generation unit 301 includes a conversion font generation unit 303 which generates a mapping table listing random character codes corresponding to all the text items and which generates a font by converting an internal table so that when one of the random character codes is specified, a corresponding original font (glyph) is selected.

The XML generation unit 301 further includes an XML data conversion unit 305 which performs conversion processing on XML rendering data in accordance with a conversion table. Furthermore, the XML generation unit 301 includes a conversion font embedding unit 306 which embeds a generated conversion font in an XML after a unique tag or a font name thereof is changed. In addition, the XML generation unit 301 includes a character-code conversion unit 307 which converts a character code of the XML data with reference to a conversion table.

The XML analyzing unit 308 includes an XML data analyzing unit 309 which analyzes standard XML data and a unique-tag analyzing unit 310 which analyzes the unique tag and checks the conversion font in a case where the conversion font is included in the XML data.

The XML analyzing unit 308 further includes a conversion-font extracting unit 311 which generates a conversion font from the extracted unique tag and an XML rendering unit 312 which performs rendering using the analyzed XML data and the conversion font.

Figure 1B:
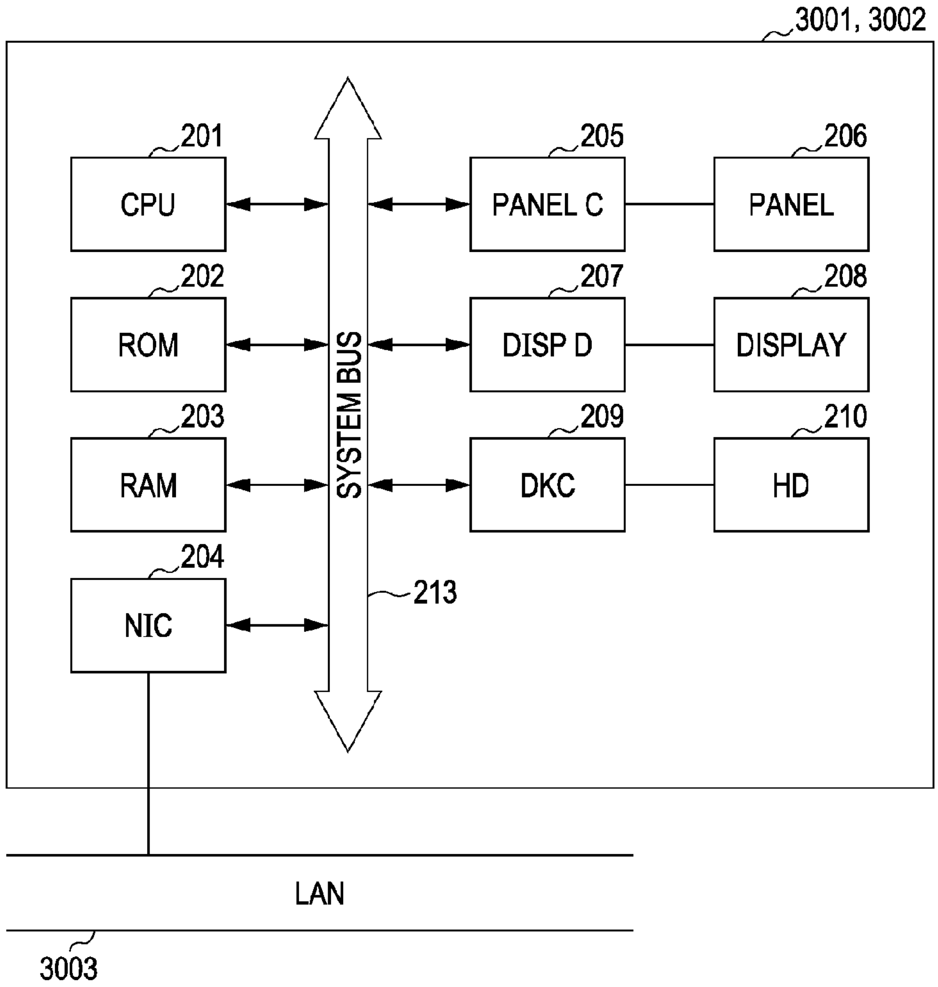
FIG. 1B is a block diagram illustrating an example of a configuration of a server apparatus or a terminal apparatus shown in FIG. 1A.

FIG. 1B is a block diagram illustrating an example of a configuration of a server apparatus or a terminal apparatus shown in FIG. 1A. This example shows a system in which the server apparatus 3001 and the terminal apparatus 3002 are communicated with each other through the network.

In FIG. 1B, the server apparatus 3001 serving as a data processing unit includes the CPU 201 which executes software stored in a ROM 202 or a mass storage device 210 such as a hard disk. The CPU 201 integrally controls various devices connected to a system bus 213.

The RAM 203 functions as a main memory or a work area for the CPU 201. An external input controller (PANEL C) 205 controls instructions input using various buttons and a touch panel (PANEL) 206 disposed on a complex machine.

A display controller (DISP C) 207 controls display of a display module (DISPLAY) 208 including a liquid crystal display.

A network interface controller (NIC) 204 performs duplex communication with other network apparatuses or file servers, for example, through a LAN (Local Area Network) 3003. Note that a read/write operation performed on the mass storage device (HD) 210 is controlled by a disk controller (DKC) 209. The mass storage device 210 also serves as a temporary storage area (spooler unit) which temporarily stores images. Note that the modules described with reference to FIG. 1A are stored in the ROM 202 or the mass storage device 210, and when the CPU 201 executes each of the modules, character processing for various XML data blocks, which will be described hereinafter, is performed.

Figure 2:
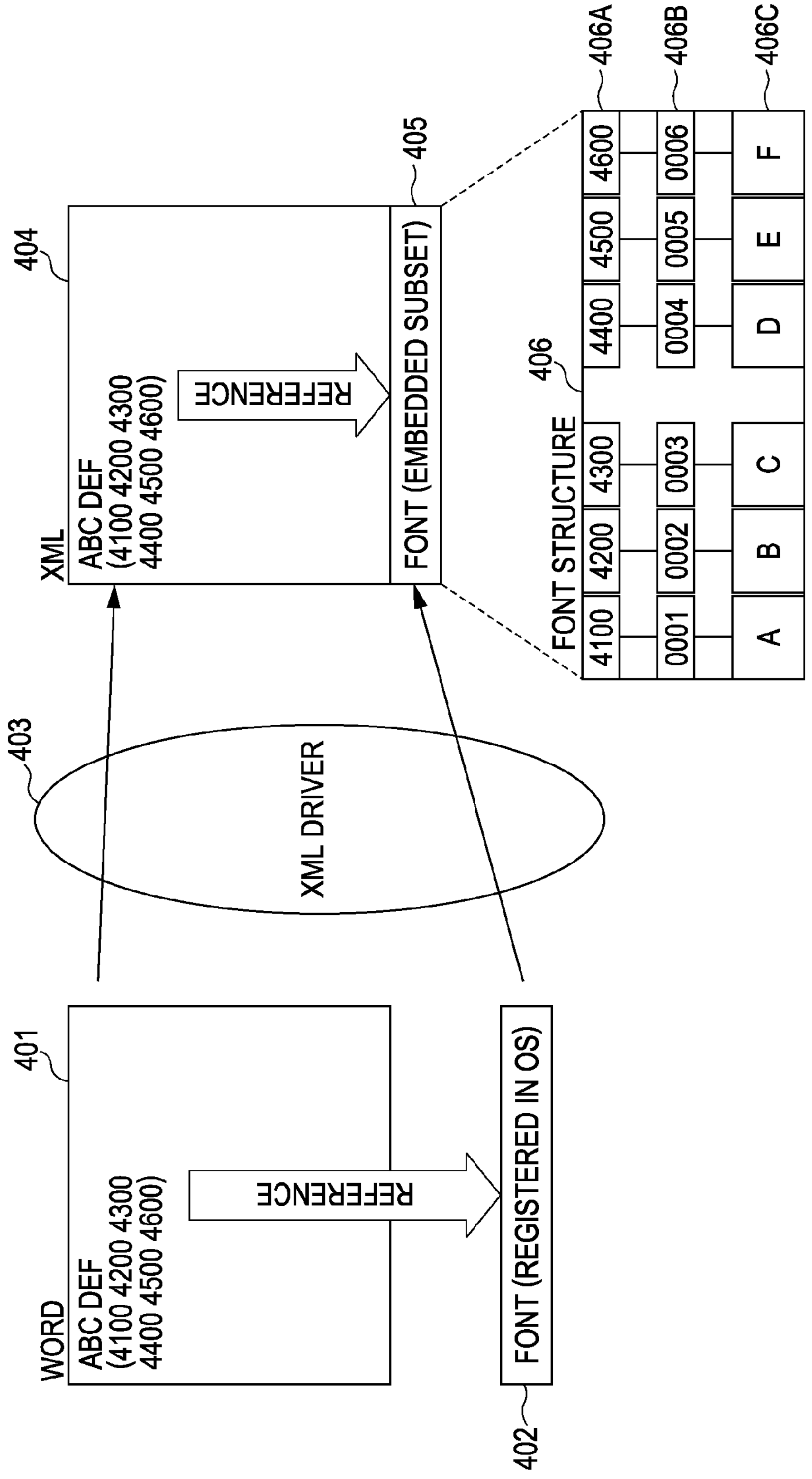
FIG. 2 is a diagram illustrating data processing performed by an XML generation unit shown in FIG. 1A.

FIG. 2 is a diagram illustrating data processing performed by the XML generation unit 301 shown in FIG. 1A. Hereinafter, a description will be made by taking a document generated using Word developed by Microsoft Corporation (hereinafter referred to as a "Word document") as an example of the electronic document which is to be converted into the XML data by a XML driver 403.

In FIG. 2, characters "ABC DEF" is described in a Word document 401, and the characters "ABC DEF" are stored as character codes of 4100, 4200, 4300, 4400, 4500, and 4600, respectively, in the document.

Here, in an OS of Windows® installed in the information processing apparatus, when characters corresponding to the character codes are to be rendered, a font 402 (for example, "Arial") registered in the OS is specified along with the character codes for a GDI (Graphic Device Interface), and then, rendering processing is performed. Here, the rendering processing includes rendering processing for screen display and rendering processing for generating data to be printed.

When document data generated using an application, for example, is rendered in the GDI, rendering information is transmitted to the XML driver 403 through the OS. Here, the XML driver 403 controlled by the OS has been installed in the storage device included the information processing apparatus, and performs character processing, which will be described below, by being executed by the CPU 201.

The XML driver 403 analyzes the rendering information received from the OS and converts the rendering information into rendering information suitable for a corresponding XML data 404. In this operation, a text code converted into the XML data 404 has a character code the same as that of the application and has a format readable using a general text editor. Here, the application includes Microsoft Word provided by Microsoft Corporation which is generally installed in PCs as business software.

As for the font, data representing only characters (glyph) used in the XML data 404 can be obtained from the OS using font information transmitted from the OS to the XML driver 403 and can be embedded in the XML data 404. The embedded font 405 is extracted using a standard XML viewer and is registered in the OS at the time of the rendering processing.

Here, a font structure 406 of the font 405 includes character codes 406A (4100, 4200, and 4300, for example), glyph codes 406B (0001, 0002, and 0003, for example), and glyphs 406C (rendering information of characters (A, B, and C, for example)).

FIGS. 3 to 9 are diagrams illustrating character processing performed by the information processing apparatus according to the exemplary embodiment.

Figure 3:
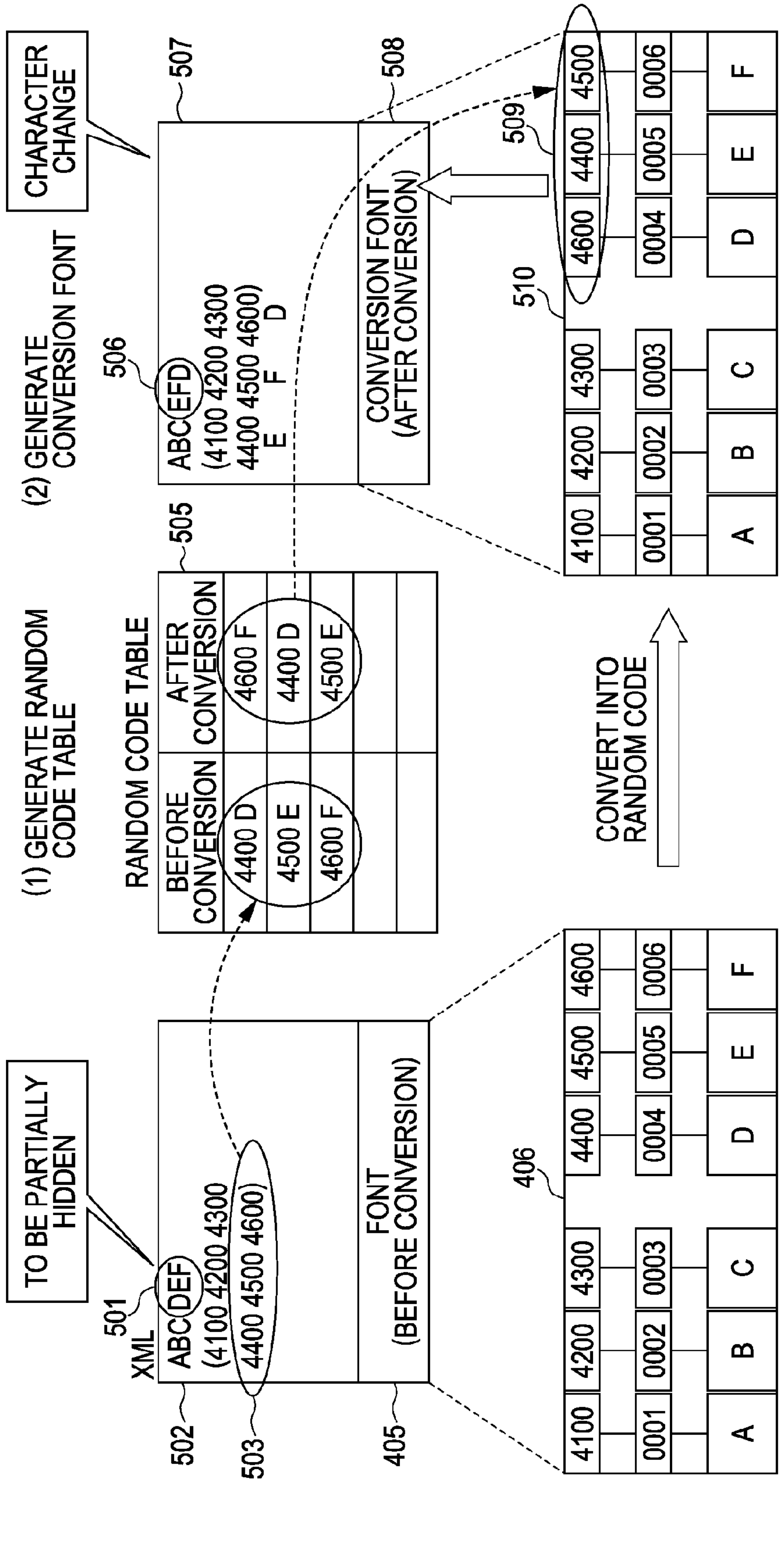
FIG. 3 is a diagram illustrating operations of character processing performed by an information processing apparatus according to the exemplary embodiment.

Referring to FIG. 3, a method for generating a conversion font for the XML shown in FIG. 2 will now be described. Note that character codes to be processed, for example, are the same as those of FIG. 2.

A case where a character string 501 corresponding to "DEF" included in XML data 502 generated by the XML driver 403 is to be partially hidden will be described with reference to FIG. 3.

First, character codes 503, that is, character codes 4400, 4500, and 4600 corresponding to the character "DEF" are extracted and are registered respective columns of "before-conversion" in a random code table 505. This operation is performed on all the characters to be hidden. Note that the characters to be hidden may be determined by a user or may be determined by being written in an area in which all characters written in the area are hidden. Alternatively, the characters to be hidden may be specified by other methods. Note that the random code table 505 functions as a mapping table which is used to convert the character codes included in the XML data, which is an example of structured document data, into random codes.

In the information processing apparatus according to this exemplary embodiment, the random code table 505 may be generated for each page or for a group of pages, and alternatively, the single random code table 505 may be generated for all pages. In this case, duplication of character codes is avoided in registration of the character codes. Note that, in this exemplary embodiment, the random code table 505 is not included in the XML data and is managed by the storage device in the server apparatus.

When the registration of the character codes in the columns of "before conversion" is completed as shown in FIG. 3, codes are randomly set in columns of "after conversion" in the random code table 505. Here, the codes to be set in the columns of "after conversion" may be selected from the codes before being converted, codes supported by the character codes convertible with the font which is currently used, or codes which is not supported by the character code.

The generation of the random code table 505 is thus completed, conversion-font generation processing which is processing of converting the font 405 which is a font before conversion (hereinafter referred to as a "pre-conversion font 405") in accordance with the random code table 505 is started.

In this exemplary embodiment, the XML driver 403 installed in the server apparatus converts the character codes 4400, 4500, and 4600 into 4600, 4400, and 4500, respectively, in accordance with the random code table 505. When an XML is rendered using the font obtained after the conversion, the character string “DEF” to be hidden are converted into a character string 506, i.e., a character string “EFD” as shown in FIG. 3.

Figure 4:
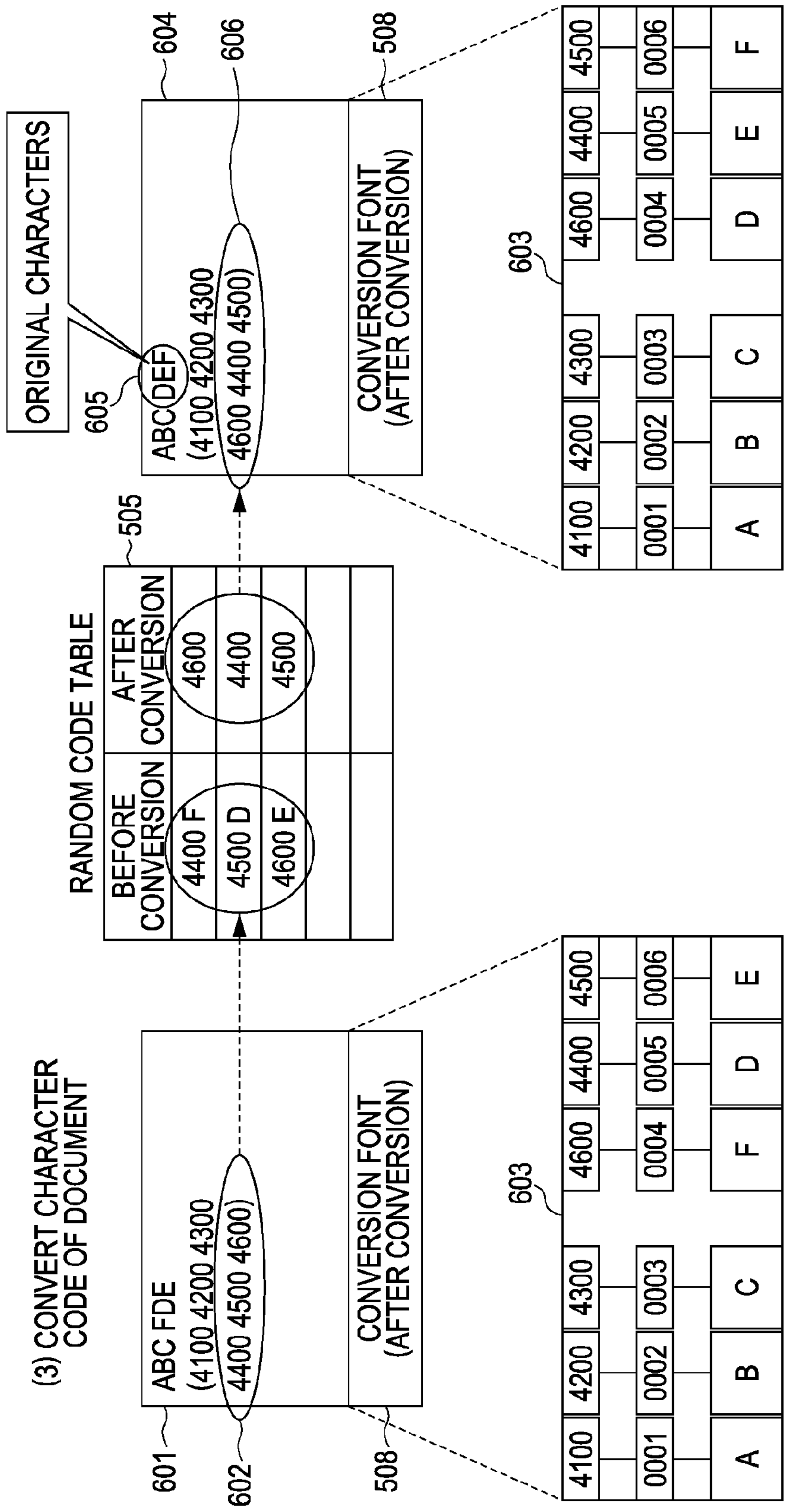
FIG. 4 is a diagram illustrating operations of the character processing performed by an information processing apparatus according to the exemplary embodiment.

Referring to FIG. 4, processing of converting the character codes of the XML data in which the conversion font is generated as shown in FIG. 3 will be described.

First, the conversion font is obtained from XML data 601 and the character codes are converted in accordance with the random code table 505. Here, the conversion font “FDE” which is generated through the conversion font generation processing of FIG. 3 is obtained.

In this exemplary embodiment, in accordance with the rule of the random code table 505, the character codes 4400, 4500, and 4600 are converted into the character codes 4600, 4400, and 4500, respectively. The XML data 601 including character codes 602 is converted through the conversion processing into XML data 604 including character codes 606 and stored in the storage device included in the server apparatus.

After this conversion, when rendering processing is performed by a dedicated XML viewer using a combination of the character codes 606 obtained through the conversion and a conversion font 508, an original character string 605, that is, the character string “DEF”, which is the character string before the conversion, can be rendered.

Figure 5:
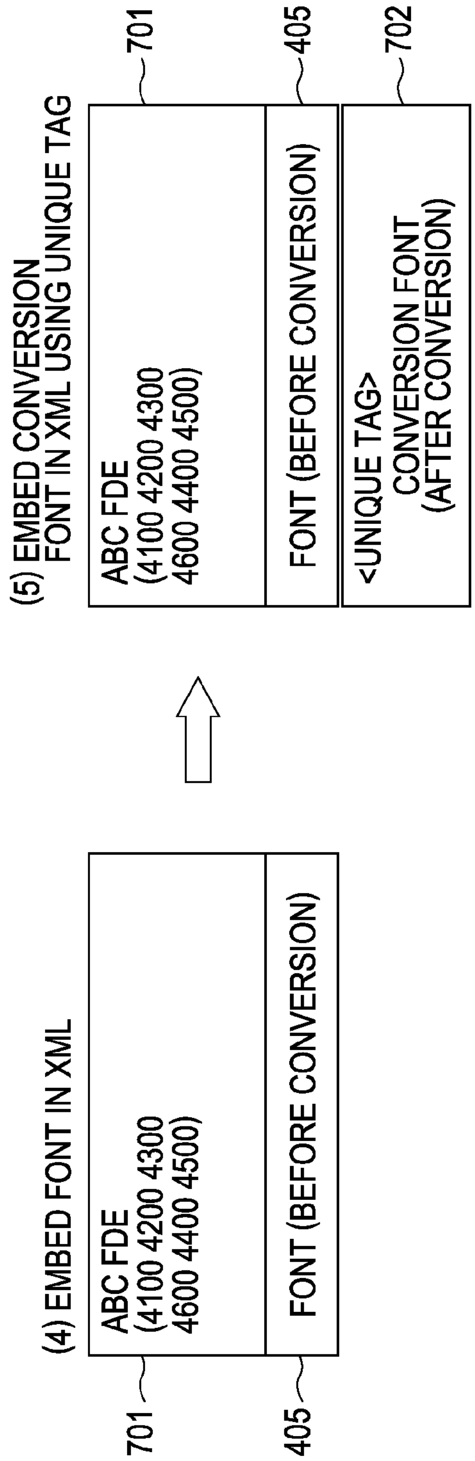
FIG. 5 is a diagram illustrating operations of the character processing performed by an information processing apparatus according to the exemplary embodiment.

Referring to FIG. 5, a method for embedding the pre-conversion font 405 and a conversion font 702 obtained after the conversion in XML data 701 which is obtained after the conversion in the server apparatus 3001 will be described hereinafter.

In a normal XML, only a single font for a character can be embedded. Therefore, in order to partially hide the characters using a standard viewer, the XML data 701 and the pre-conversion font 405 are embedded in an XML, so as to correspond to each other.

Furthermore, in order to attain appropriate display of a document only by the dedicated viewer, the conversion font 702, which is obtained after the conversion, is added to the XML data 701.

In the terminal apparatus 3002 including the standard viewer, the conversion font 702 is not used since the conversion font 702 is a unique tag (which functions as unique identification information), and therefore, the character string “FDE” is rendered using the pre-conversion font 405. Note that the unique tag 702 is not processed using the standard viewer but functions as a tag which can be identified using the dedicated viewer.

Figure 6:
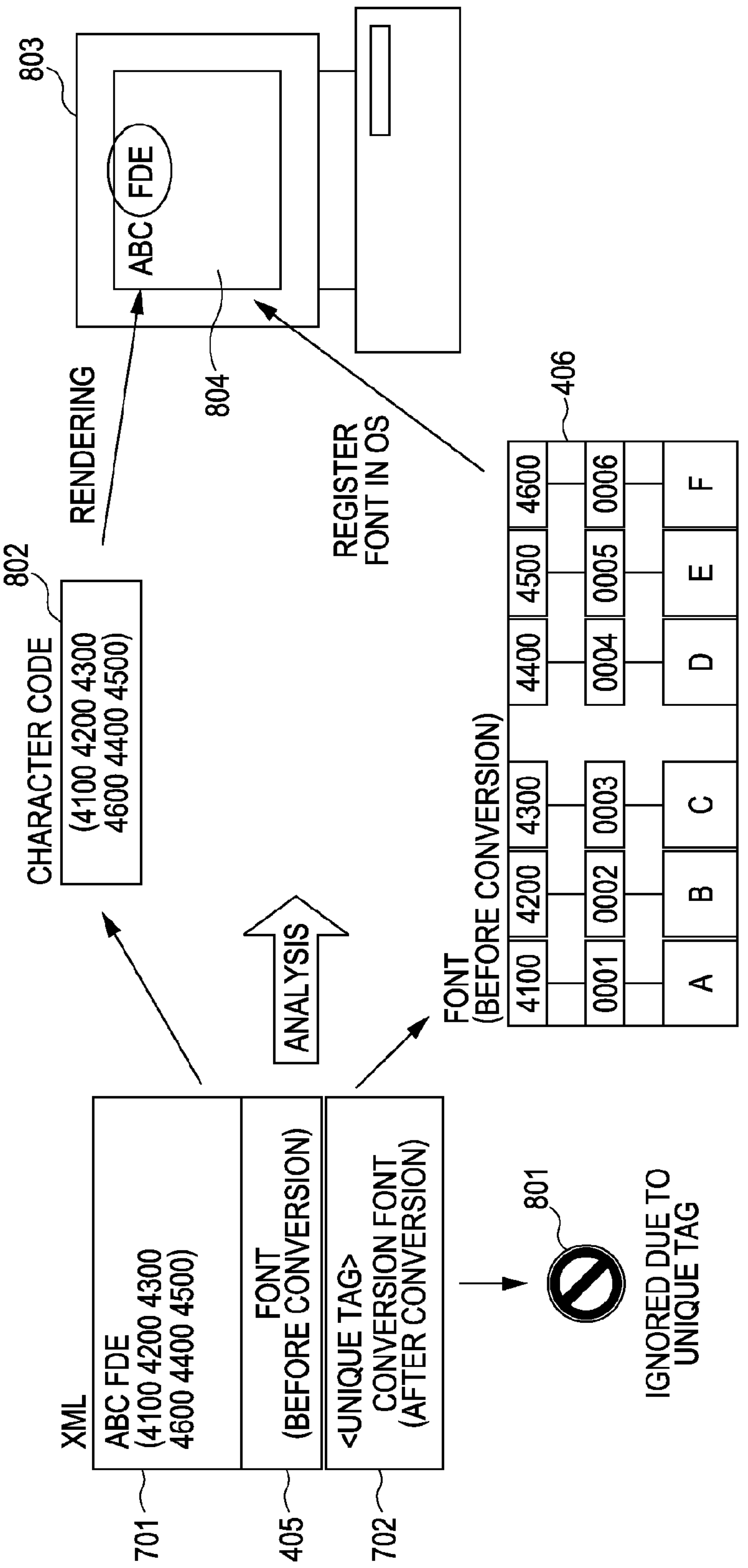
FIG. 6 is a diagram illustrating operations of the character processing performed by an information processing apparatus according to the exemplary embodiment.

Referring to FIG. 6, character-rendering processing performed when a third party refers to an electronic document of an XML format which is registered in the server apparatus using a normal XML viewer or a text editor installed in the terminal apparatus will now be described.

First, the character codes are converted, the XML data 701 including the conversion font 702 embedded therein is obtained from the server apparatus, and the XML data 701 is analyzed using the normal XML viewer installed in the terminal apparatus. In this case, a character-code string 802 and the pre-conversion font 405 are extracted, and the font 405 is registered in the OS so as to be ready to be used. Then, a text-rendering instruction is supplied to the OS and the rendering processing is performed. Here, the normal XML viewer installed in the terminal apparatus ignores the conversion font 702 which is embedded in the XML data 701 using the unique tag since the conversion font 702 cannot be analyzed using the normal XML viewer.

Here, the character codes “4600”, “4400”, and “4500” included in the character-code string 802 correspond to the characters “F”, “D”, and “E” of the font before the conversion, respectively.

Here, the character string “FDE” is rendered in a display screen 804 of a display device included in a terminal apparatus 803 serving as the information processing apparatus.

Figure 7:
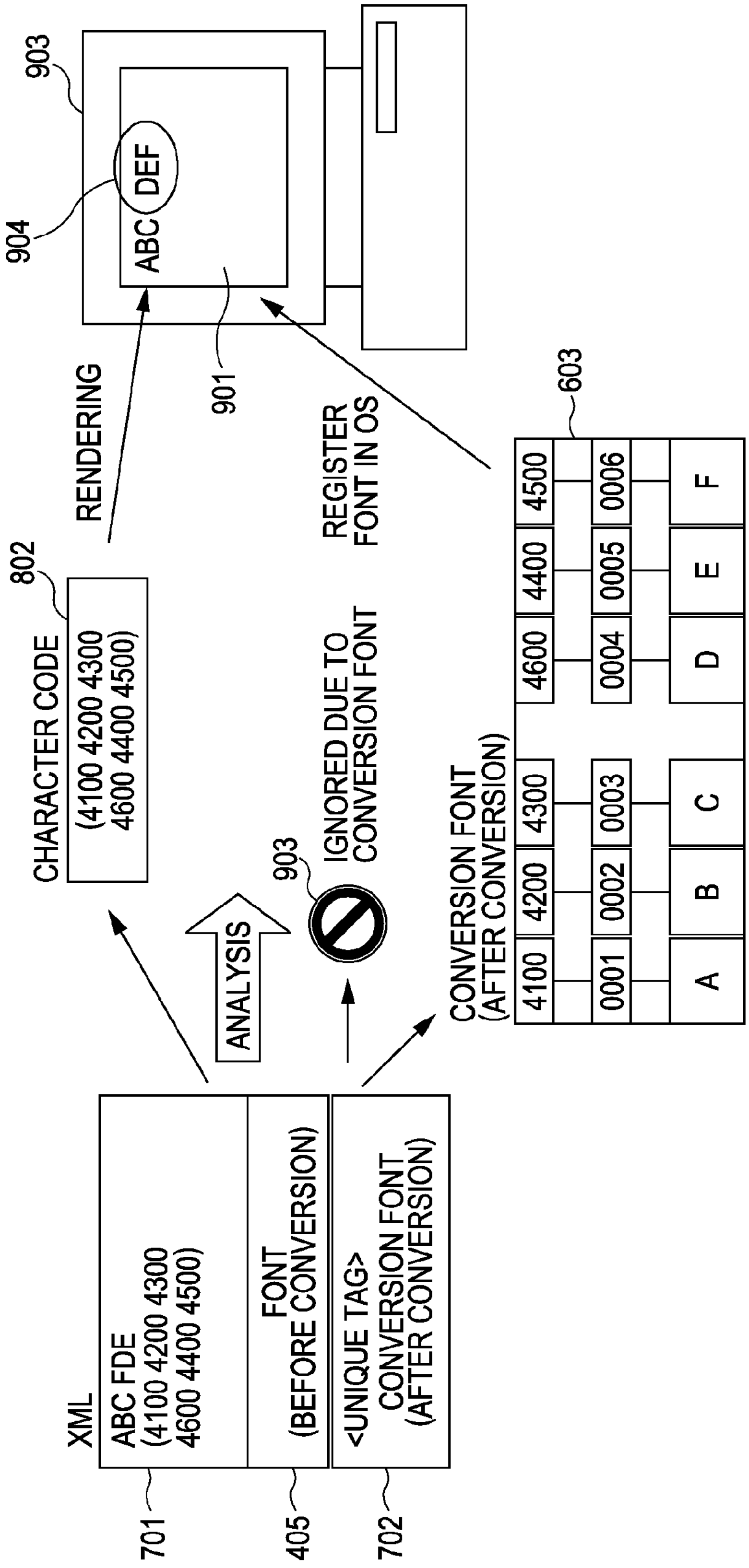
FIG. 7 is a diagram illustrating operations of the character processing performed by an information processing apparatus according to the exemplary embodiment.

Referring to FIG. 7, a case where rendering processing is performed using the dedicated XML viewer installed in the terminal apparatus according to this exemplary embodiment and a case where printing processing is performed using a printer, for example, will be described.

First, the terminal apparatus converts the character codes, and obtains the XML data 701 including the conversion font 702 embedded therein from the server apparatus. Then, the terminal apparatus analyzes the XML data 701 using the dedicated XML viewer of this exemplary embodiment. The character-code string 802 and a conversion font 603 are extracted, and the conversion font 603 is registered in the OS. Then, a text-rendering instruction is supplied to the OS and the rendering processing is performed. In this example, since the conversion font 702 is embedded by the unique tag in the XML data 701, the pre-conversion font 405 is not extracted, that is, ignored.

Accordingly, the character codes “4600”, “4400”, and “4500” included in the character-code string 802 correspond to the characters “D”, “E”, and “F” of the font before the conversion, respectively.

Figure 8:
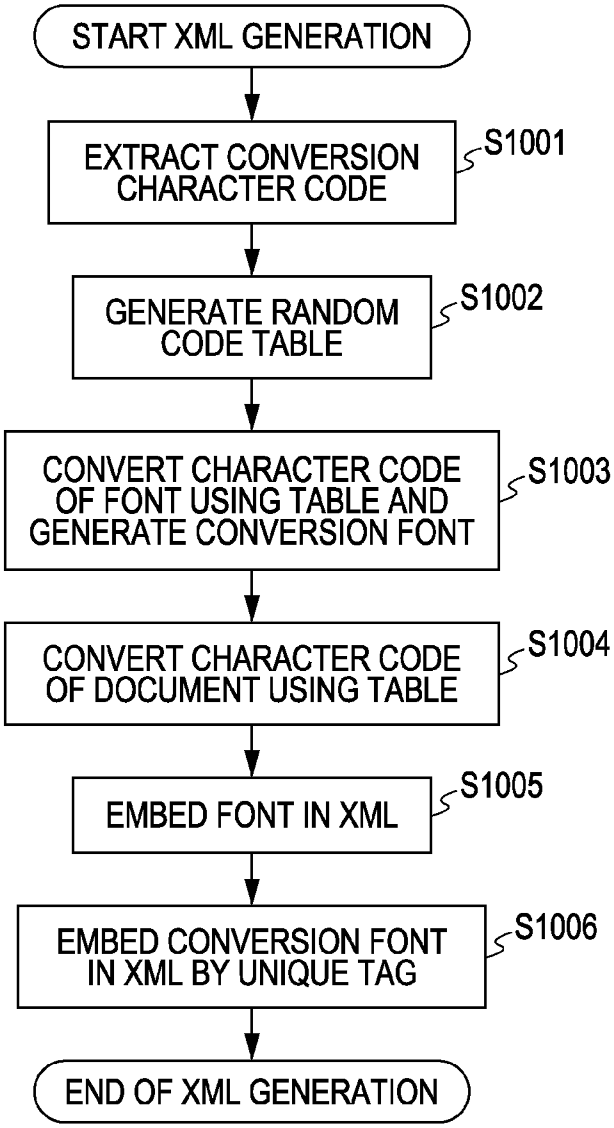
FIG. 8 is a flowchart illustrating an example of a procedure of data processing performed by the server apparatus according to the exemplary embodiment.

In this case, “DEF” is rendered as a character string 904 in a display screen 901 of a display device included in a terminal apparatus 903. Note that when the character string 904 is rendered using the printer driver, “DEF” is printed. FIG. 8 is a flowchart illustrating an example of a procedure of data processing performed using the server apparatus according to the exemplary embodiment. That is, FIG. 8 shows an example of XML generation processing performed using the XML driver 403 installed in the server apparatus. Note that operations performed in step S1001 to step S1006 are realized when the CPU 201 loads the XML driver 403 in the RAM 203 and executes the XML driver 403.

Hereinafter, a case where the XML data 502 and the embedded font 405 are generated when a request of printing (conversion) processing is issued to the XML driver 403 in accordance with an application document, and the XML driver 403 performs an operation so that the character string 501, that is, character string “DEF” is partially hidden will be described.

In step S1001, the XML driver 403 installed in the server apparatus extracts the character string 501, that is, the character string “DEF”, and registers the character string 501 in the columns of “before conversion” of the random code table 505. Note that this processing is performed in the RAM 203 included in the server apparatus.

This processing is performed on all characters to be hidden (characters “D”, “E”, and “F” included in the character string 501 in this exemplary embodiment).

Note that the random code table 505 may be generated for each page or for a group of pages, and alternatively, the single random code table 505 may be generated for all pages.

In this case, duplication of character codes is avoided in registration. When the registration is completed, the XML driver 403 randomly sets codes in the columns of “after conversion” of the random code table 505 (refer to the random code table 505 shown in FIG. 3) in step S1002.

Here, the codes to be set in the columns of “after conversion” may be selected from the codes before conversion, codes supported by the character codes corresponding to the font which is currently used, or codes which are not supported by the character code.

After the generation of the random code table 505 is thus completed, the XML driver 403 converts character codes 509 which correspond to the pre-conversion font 405 in accordance with the random code table 505 in step S1003.

In this example, the XML driver 403 converts the character codes "4400", "4500", and "4600" into "4600", "4400", and "4500", respectively, as shown in FIG. 3.

In step S1004, the XML driver 403 selects the characters to be converted from the XML data 601 and converts the character codes in accordance with the random code table 505.

In this example, as with the font, the XML driver 403 converts the character codes "4400", "4500", and "4600" into "4600", "4400", and "4500", respectively, as shown in FIG. 4.

In step S1005, as shown in FIG. 4, the XML data 604 is modified in accordance with the character codes 606 which are results of the conversion, and the XML data 604 is stored in the storage device included in the server apparatus.

In step S1006, the XML driver 403 sets the XML data 701 obtained after the conversion and the pre-conversion font 405 to the XML so that the XML data 701 corresponds to the font 405. Furthermore, the XML driver 403 adds the font 702 obtained after the conversion to the XML data 701 using a unique tag so that the document is appropriately displayed only by the dedicated viewer. This processing is thus terminated.

Figure 9:
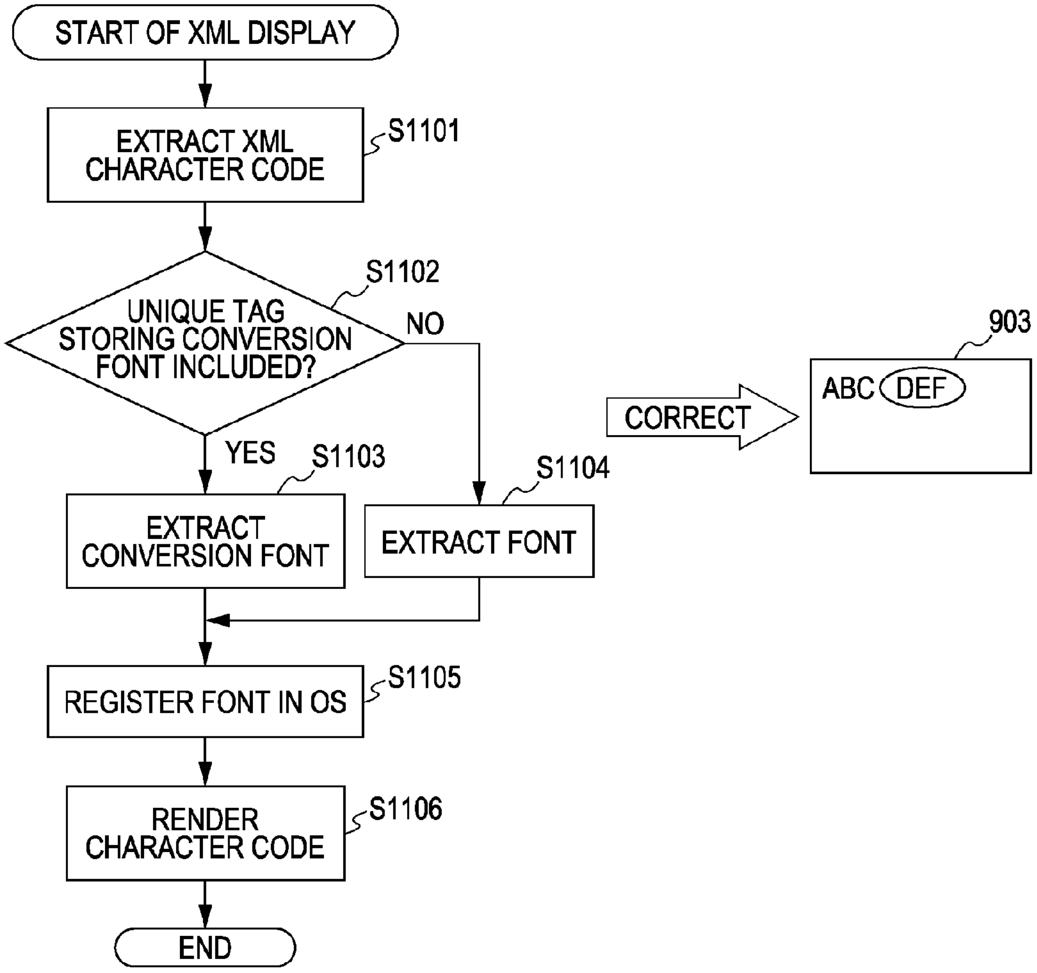
FIG. 9 is a flowchart illustrating an example of a procedure of data processing performed by the information processing apparatus according to the exemplary embodiment.

FIG. 9 is a flowchart illustrating an example of a procedure of data processing performed by the information processing apparatus according to the exemplary embodiment. In this example, the terminal apparatus obtains XML data from the server apparatus, and renders an XML obtained by converting XML data using a dedicated viewer which has been installed in the terminal apparatus. Note that operations performed in step S1101 to step S1106 are realized when the CPU 201 included in the information processing apparatus loads the dedicated viewer in the OS and executes the dedicated viewer.

After the character codes are converted and the XML data 701 in which the font 405 and the conversion font 702 are embedded is obtained, the dedicated XML viewer analyzes the XML data 701 so as to extract XML character codes in step S1101.

In step S1102, the dedicated viewer determines whether the XML data 701 has a unique tag representing a conversion font. When the determination is affirmative, the process proceeds to step S1103 where the conversion font 702 is extracted from the XML data 701 and the pre-conversion font 405 is not extracted, that is, ignored. In step S1105, the character-code string 802 extracted in step S1103 and the conversion font 603 are registered in the OS. In step S1106, a rendering instruction is supplied to the OS so that the rendering processing is performed. This processing is thus terminated.

On the other hand, when the determination is negative in step S1102, the font 405 is extracted in step S1104 and is registered in the OS in step S1105. In step S1106, a rendering instruction is supplied to the OS so that the rendering processing is performed. This processing is thus terminated.

Here, as shown in FIG. 7, the character codes "4600", "4400", and "4500" included in the character-code string 802 correspond to "D", "E", and "F".

In this case, the character string "DEF" is rendered as the character string 904 in the display screen 903 of the terminal apparatus 901.

Figure 10:
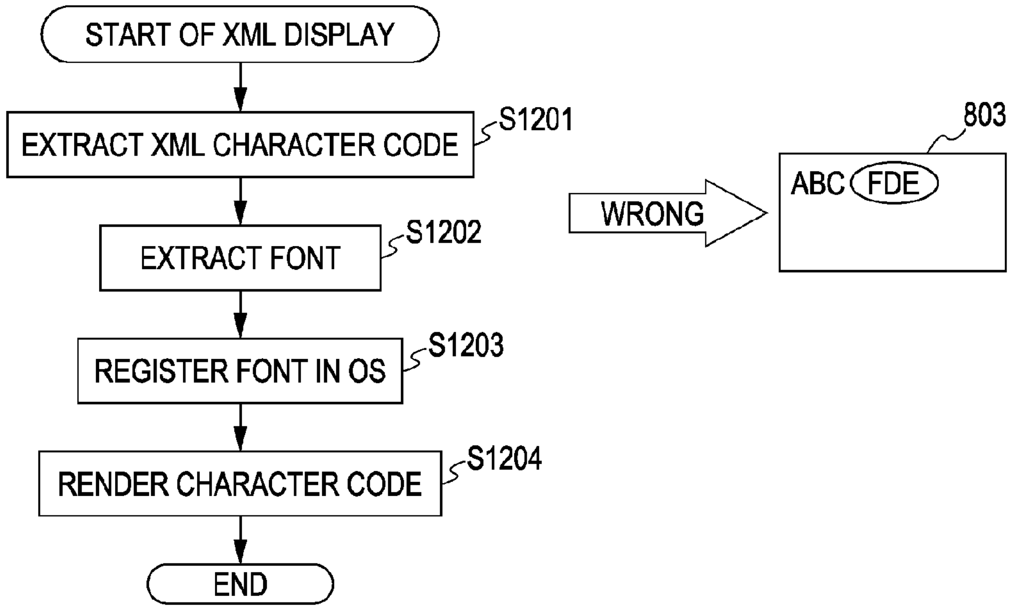
FIG. 10 is a flowchart illustrating another example of the procedure of the data processing performed by the information processing apparatus according to the exemplary embodiment.

FIG. 10 is a flowchart illustrating still another example of the procedure of the data processing performed by the information processing apparatus according to the exemplary embodiment. In this example, the terminal apparatus obtains converted XML data from the server apparatus and renders an XML converted using the standard viewer which has been installed in the terminal apparatus. Note that operations performed in step S1201 to step S1204 are realized when the CPU 201 included in the information processing apparatus loads the standard viewer in the OS and executes the standard viewer.

After the character codes are converted and the XML data 701 in which the font 405 and the conversion font 702 are embedded is obtained, the standard XML viewer analyzes the XML data 701 so as to extract XML character codes in step S1201. In step S1202, the standard viewer extracts the pre-conversion font 405.

In step S1203, the extracted font is registered in the OS so as to be ready to be used. A rendering instruction is supplied to the OS so that the rendering processing is performed in step S1204. In this case, the conversion font 702 is ignored since the standard XML viewer cannot analyze the conversion font 702 which is embedded using the unique tag.

Accordingly, as shown in FIG. 6, the codes "4600", "4400", and "4500" included in the character-code string 802 correspond to the characters "F", "D", and "E", respectively. Therefore, the character string "FDE" is rendered in the display screen 804 included in the terminal apparatus 803.

FIG. 11 is a diagram illustrating examples of random codes generated in the server apparatus according to the exemplary embodiment. In this example, every time original characters 1303 to be hidden are subjected to font conversion, the original characters 1303 are converted into arbitrary character codes.

In this exemplary embodiment, every time the random code table 505 shown in FIG. 3 which is used by the server apparatus is generated, different code strings are generated. Therefore, a different one of random-code strings 1302 generated for the original character string can be displayed in the standard viewer by being selected from the table listing the relationships between the number of generation of XMLs 1301 and the character-code strings every time the display is performed. Accordingly, a malicious analysis performed by the third party is virtually prevented.

Figure 12:
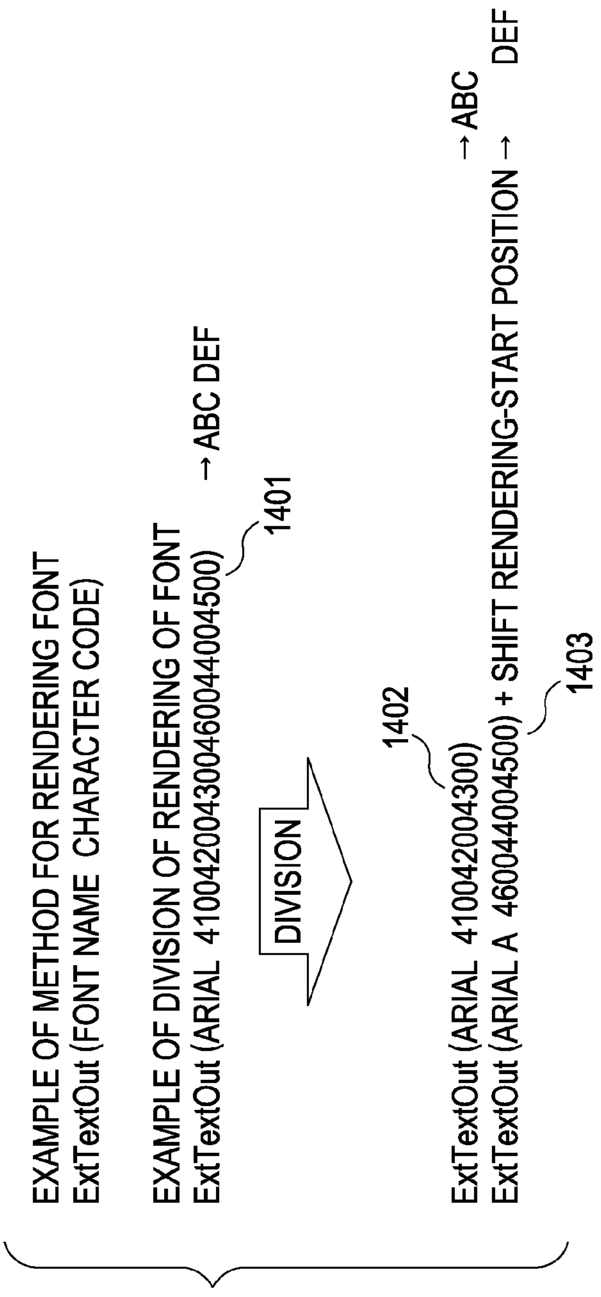
FIG. 12 is a diagram illustrating character processing performed by the server apparatus according to the exemplary embodiment.

As described above, since although different character-code strings are obtained every generation thereof, dedicated fonts for the character-code strings are generated every generation thereof and the dedicated fonts are obtained to be used by the dedicated viewer, a character string 1304 of the original document can be normally displayed. FIG. 12 is a diagram illustrating character processing performed by the server apparatus according to the exemplary embodiment. Hereinafter, processing of dividing a document for partially hiding a character string and processing of dividing a font will be described.

The OS of Windows® provided by Microsoft® Corporation has a text (font) rendering function called "ExtTextOut" which is generally used for rendering text. Hereinafter, processing of rendering a character string "ABC DEF" using the text (font) rendering function will be described.

When the application document is first converted into an XML, the character string "ABC DEF" is rendered as successive character codes 1401 in the following format: ExtTextOut(Arial 410042004300460044004500). When the entire document is to be hidden, all the codes are simultaneously converted into random codes.

However, when the document is to be partially hidden, rendering of the character codes 1401 are divided so that duplication of codes to be converted and codes not to be converted is avoided. That is, the character codes 1401 are divided into character codes 1402 having a format of ExtTextOut(Arial 410042004300) and character codes 1403 having a format of ExtTextOut(Arial 460044004500). A rendering-start point for the divided character codes, that is, the character codes 1402 and the character codes 1403, is set in accordance with a rendering-start point of the character codes 1401 obtained before the division. Furthermore, a font name should be changed and a font file should be divided.

Figure 13:
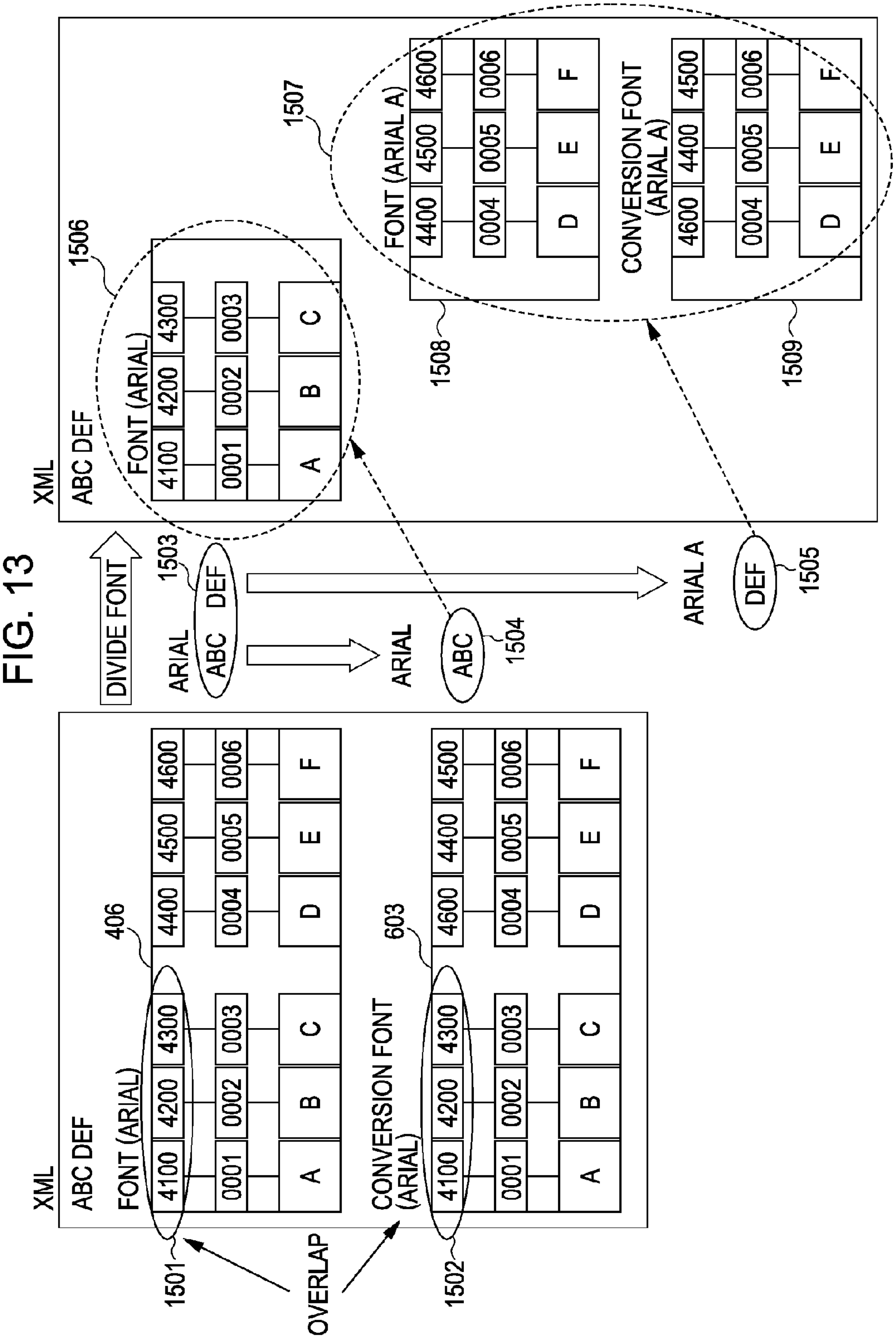
FIG. 13 is a diagram illustrating a method for dividing a font performed by the server apparatus according to the exemplary embodiment.

FIG. 13 is a diagram illustrating a method for dividing a font performed by the server apparatus according to the exemplary embodiment.

In the foregoing description, the conversion font is generated by converting codes included in a single font file. However, in this method, character codes 1501 which are not to be converted and character codes included in a conversion font 603 should not be overlapped, and accordingly, usage of random codes is restricted.

Furthermore, since the character codes 1501 and 1502 included in respective two fonts are identical, there arises a problem in that a size of a file including XML data having a large number of characters becomes unnecessarily large.

To address these problems, the processing of dividing a font file in accordance with the division of the character codes shown in FIG. 12 is effectively employed.

In this case, an original character string 1503 to be rendered, that is, a character string "ABC DEF" is divided into a character string 1504, that is, a character string "ABC" and a character string 1505, that is, a character string "DEF". Then, different font names, i.e., "Arial" and "Arial A" are assigned to the different character strings 1504 and 1505, respectively, so that different fonts are assigned to the different character strings 1504 and 1505. The font name can be arbitrarily changed but can be changed in accordance with the restriction of the OS and an XML format.

In the original font 406, a font 1506 to be hidden is deleted while the character string 1501 which does not overlap with any other characters remains. On the other hand, fonts 1508 and 1509 in which overlapped text portions are deleted are generated so as to constitute a font 1507 corresponding to the characters to be hidden.

Second Exemplary Embodiment

The method for embedding the conversion font in the XML data using the unique tag is described in the first exemplary embodiment. In a second exemplary embodiment, a method for embedding a conversion font in XML data as a font normally used will be described.

The XML data which is obtained after the font is divided as shown in FIG. 13 includes a font 1506 (Arial) of overlapped characters and fonts 1508 and 1509 (Arial A) included in the font 1507 having the characters to be hidden and font names thereof overlap with each other. Therefore, the three fonts cannot be embedded as an XML standard font all together.

Figure 14:
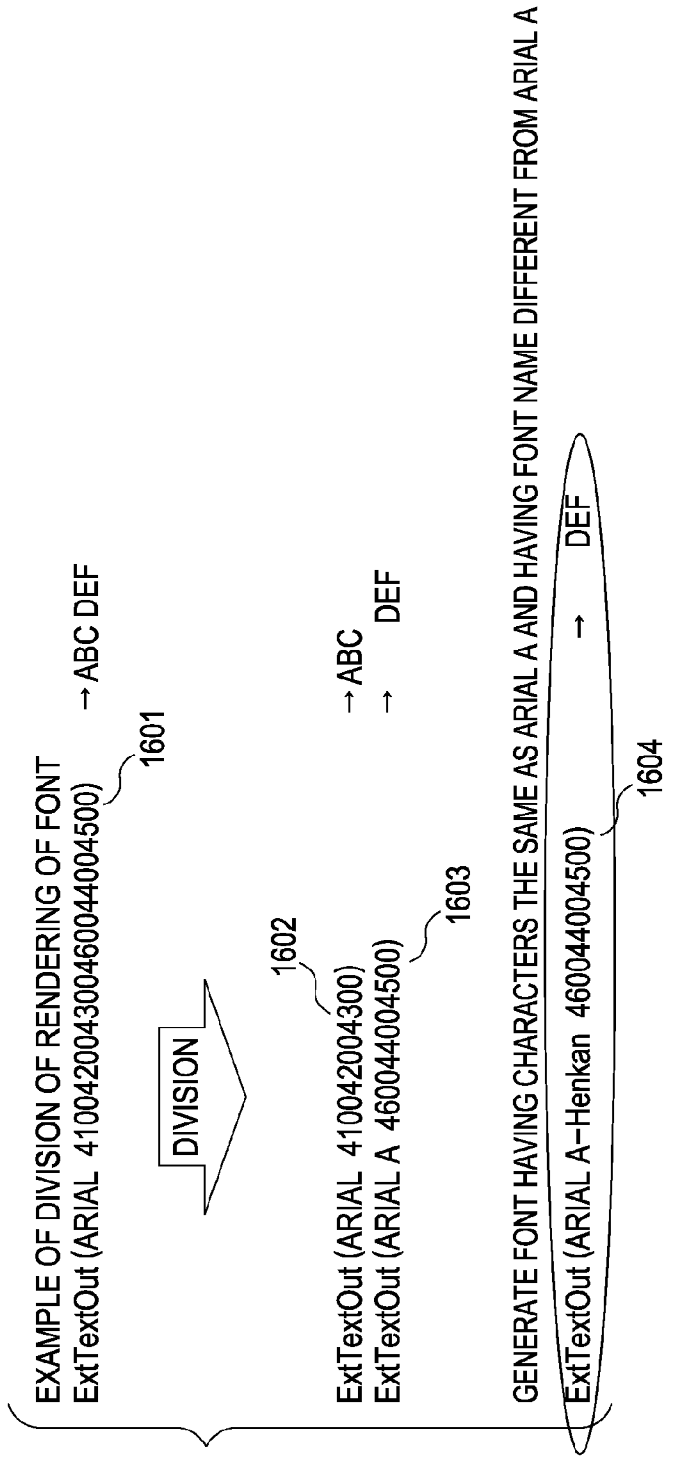
FIG. 14 is a diagram illustrating a state of the character processing performed by the server apparatus according to the exemplary embodiment.

Therefore, as shown in FIG. 14, a font name of a conversion font 1509 is changed to "Arial A-Henkan" so as not to overlap with the other two font names. The font name can be arbitrarily changed but changed in accordance with the restriction of an OS and an XML format. FIG. 14 shows an example of font rendering in a case where the font name "Arial A" which is specified for rendering characters is changed to the font name "Arial A-Henkan".

Figure 15:
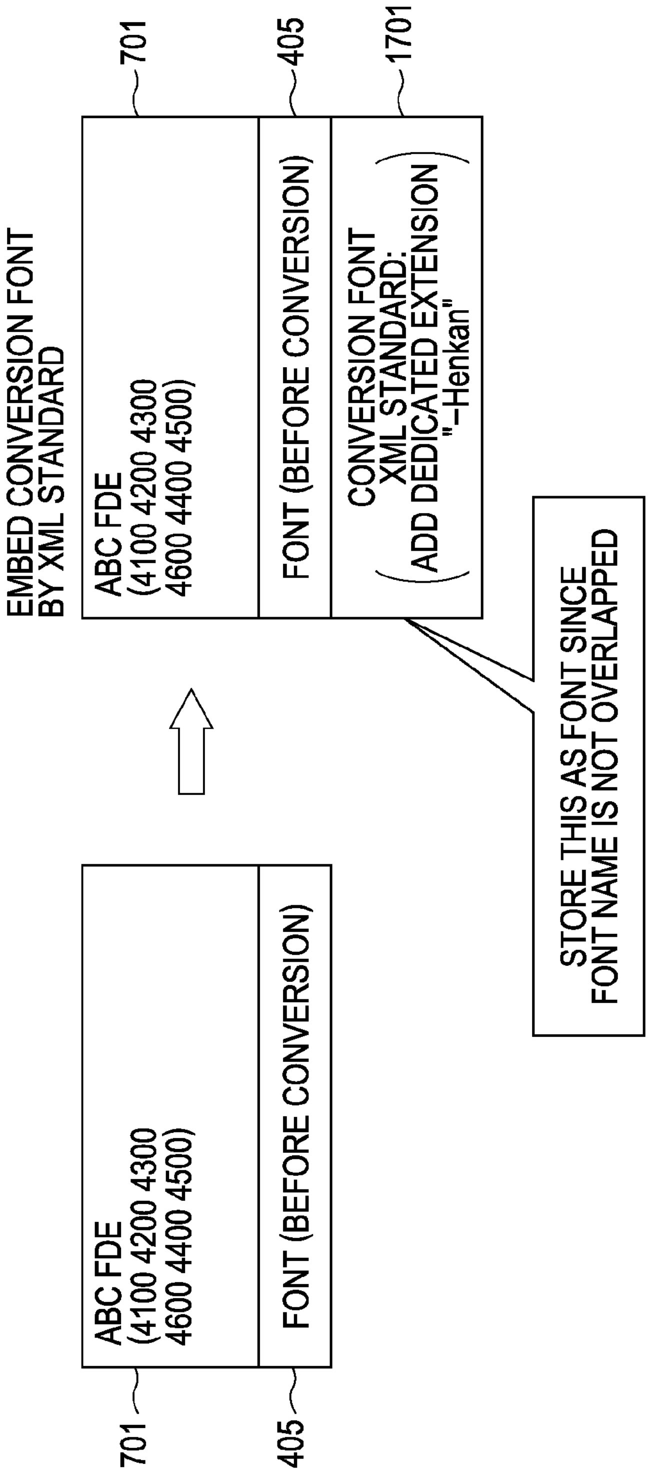
FIG. 15 is a diagram illustrating another state of the character processing performed by the server apparatus according to the exemplary embodiment.

FIG. 15 is a diagram illustrating a state of the character processing performed by the server apparatus according to the exemplary embodiment. In this example, a pre-conversion font and a font obtained after conversion are embedded in XML data obtained after the conversion using an XML standard font.

In normal XML data 701, only a font 405 can be embedded as a font for characters. Therefore, the XML data 701 obtained after the conversion and the pre-conversion font 405 which are associated with each other are embedded in the XML data 701 so that a character string partially hidden is displayed in a standard viewer.

Furthermore, a conversion font 1701 obtained after the conversion which has a font name including a dedicated extension "-Henkan" added thereto is added to the XML data 701 so that a document is appropriately displayed only using a dedicated viewer. Accordingly, when the standard viewer is employed, the conversion font 1701 is not used and a character string "FDE" is rendered using the pre-conversion font 405.

Figure 16:
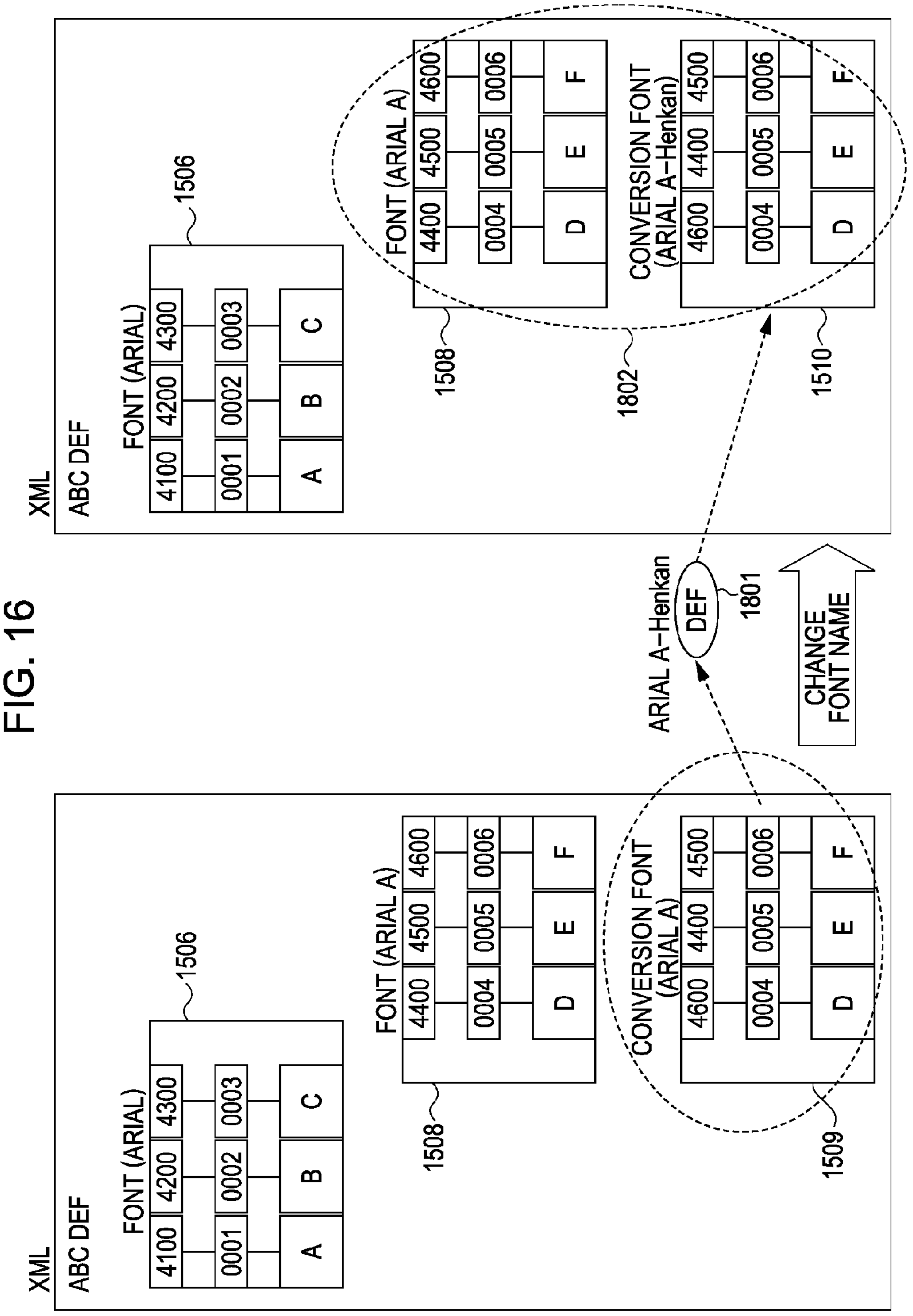
FIG. 16 is a diagram illustrating a further state of the character processing performed by the server apparatus according to the exemplary embodiment.

FIG. 16 is a diagram illustrating still another state of the character processing performed by the server apparatus according to the exemplary embodiment. A method for dividing a font in a case where the dedicated extension "-Henkan" is added will now be described.

In FIG. 16, the font 1506, the font 1508, and the conversion font 1509 are font files obtained after the font is divided as shown in FIG. 13. In these font files, a font name 1801 of the conversion font 1509 is changed from "Arial A" to "Arial A-Henkan", and the font 1509 is embedded in an XML 1802 as an XML standard font 1508 having a font name different from a font name of the font 1506.

Figure 17:
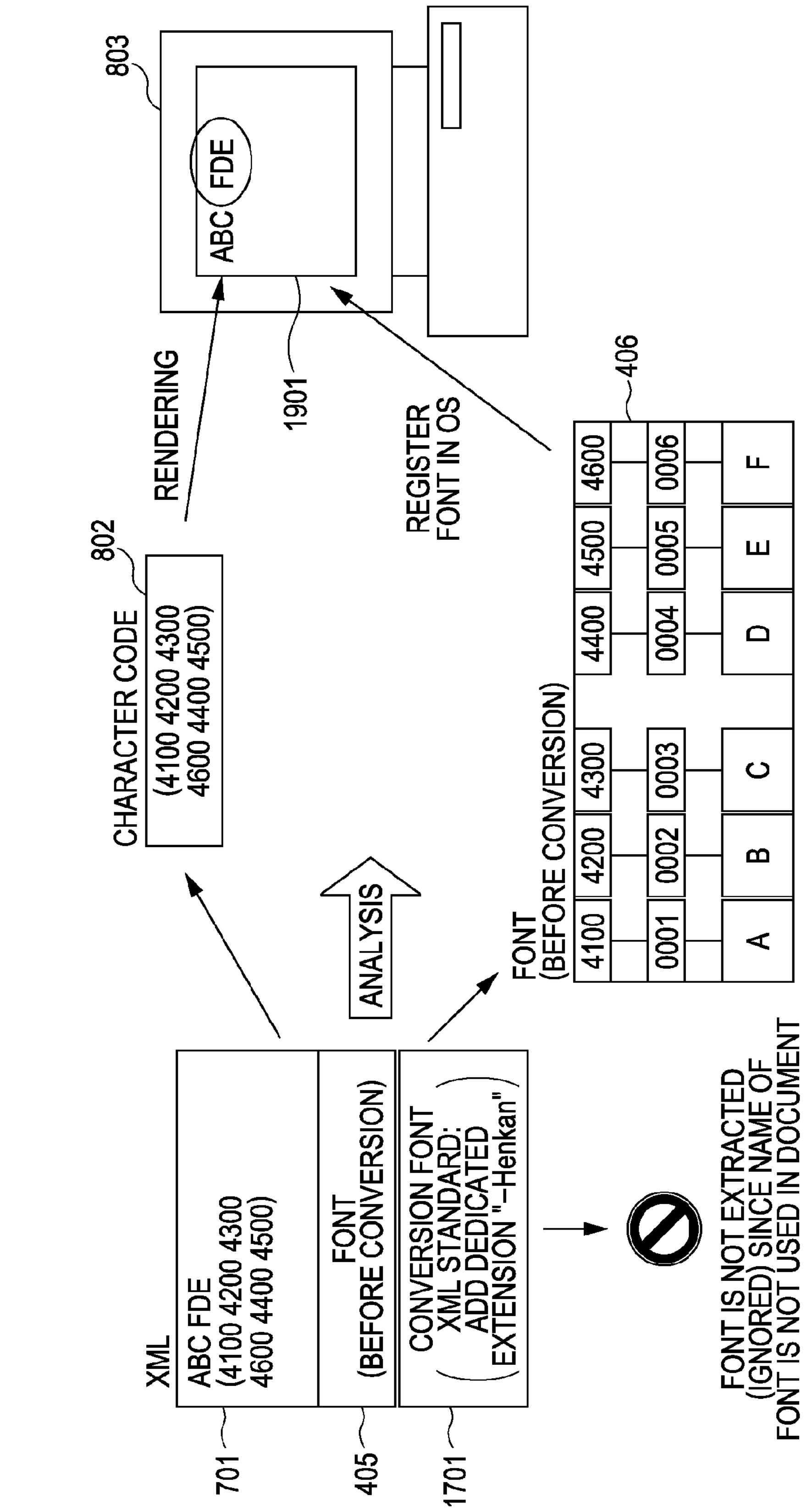
FIG. 17 is a diagram illustrating an example of character-rendering processing performed by the terminal apparatus according to the exemplary embodiment.

FIG. 17 is a diagram illustrating an example of character-rendering processing performed by a terminal apparatus according to the exemplary embodiment. In this example, rendering processing performed in a case where a third party refers to the XML using a standard XML viewer or a text editor installed in the terminal apparatus will be described.

As shown in FIG. 17, after the XML data 701 in which character codes included therein are converted and which includes the font 405 and the conversion font 1701 embedded therein is analyzed using the standard XML viewer, character-code string 802 and the pre-conversion font 405 are extracted, and the font 405 is registered in the OS so as to be ready to be used. Then, a text-rendering instruction is supplied to the OS so that the rendering processing is performed.

Since the conversion font 1701 is embedded as a standard font, the conversion font 1701 can be analyzed using the standard XML viewer. However, since the conversion font 1701 has a font name (a font name having a dedicated extension "-Henkan" added thereto) which is not used in text rendering in the XML, the conversion font 1701 is not registered in the OS.

The character-code string 802 includes character codes "4600", "4400", and "4500", and characters of the font before conversion corresponding to the character codes "4600", "4400", and "450" are "F", "D", and "E", respectively.

Accordingly, a character string "FDE" is rendered in a display screen 1901 of a terminal apparatus 803.

Figure 18:
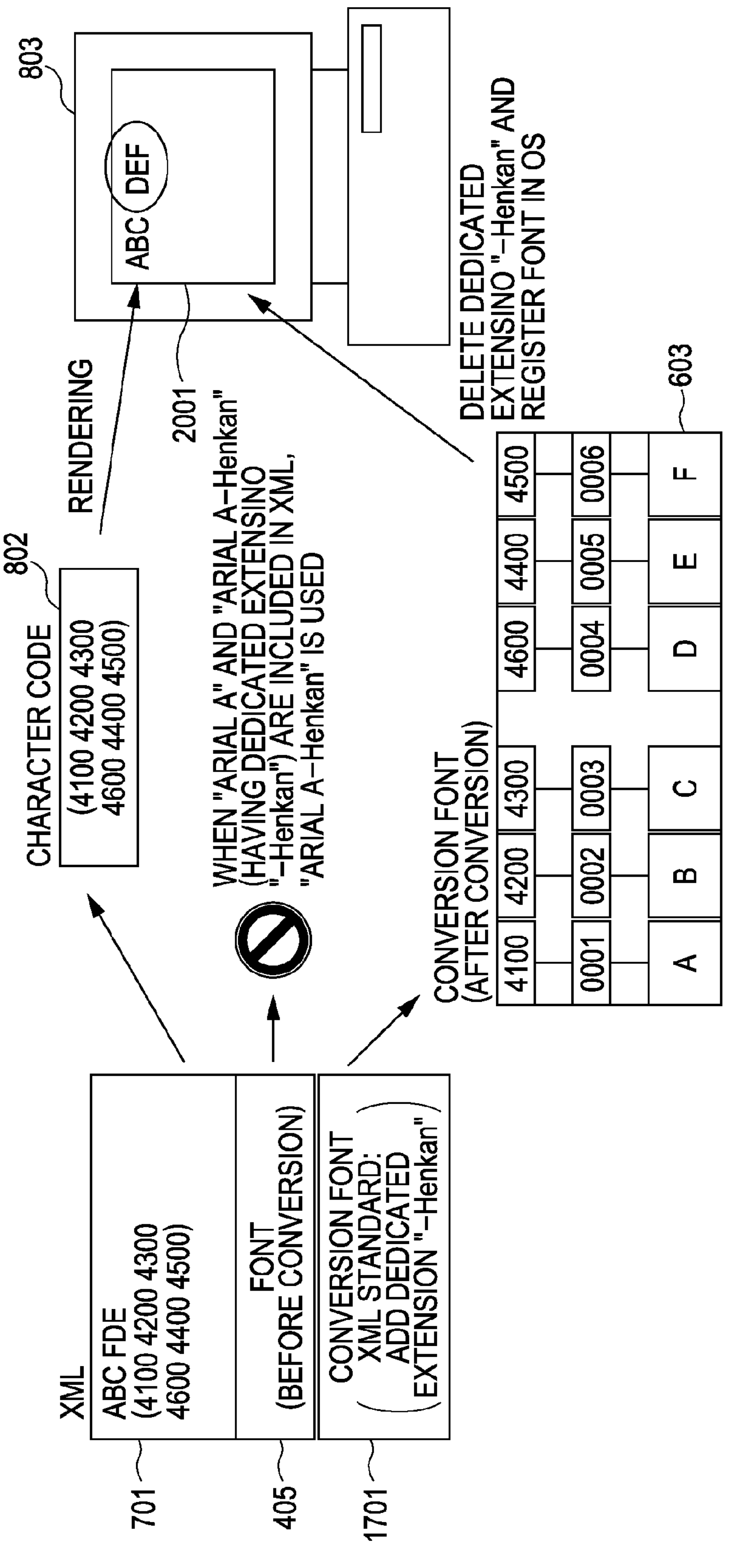
FIG. 18 is a diagram illustrating another example of the character-rendering processing performed by the terminal apparatus according to the exemplary embodiment.

FIG. 18 is a diagram illustrating another example of the character-rendering processing performed by the terminal apparatus according to the exemplary embodiment. In this example, the XML is rendered using a dedicated XML viewer or a printer, for example.

As shown in FIG. 18, the XML data 701 in which the character codes included therein are converted and which includes the font 405 and the conversion font 1701 embedded therein is analyzed using the dedicated XML viewer. In this case, the character-code string 802 and a conversion font 603 are extracted using the dedicated XML viewer, and the conversion font 603 is registered in the OS. Then, a text-rendering instruction is supplied to the OS so that the rendering processing is performed.

Here, the font 405 having the font name "Arial A" is not extracted since the font name "Arial A-Henkan" generated in accordance with the font name "Arial A" is stored in the XML.

The character-code string 802 includes character codes "4600", "4400", and "4500", and characters of the font corresponding to the character codes "4600", "4400", and "4500" are "D", "E", and "F", respectively.

Accordingly, a character string "DEF" is rendered in a display screen 2001 of a terminal apparatus 803.

Third Exemplary Embodiment

In this exemplary embodiment, an example of character processing performed in a case where a document should not be displayed in a standard viewer but should be properly searched for by text searching will be described.

Figure 19:
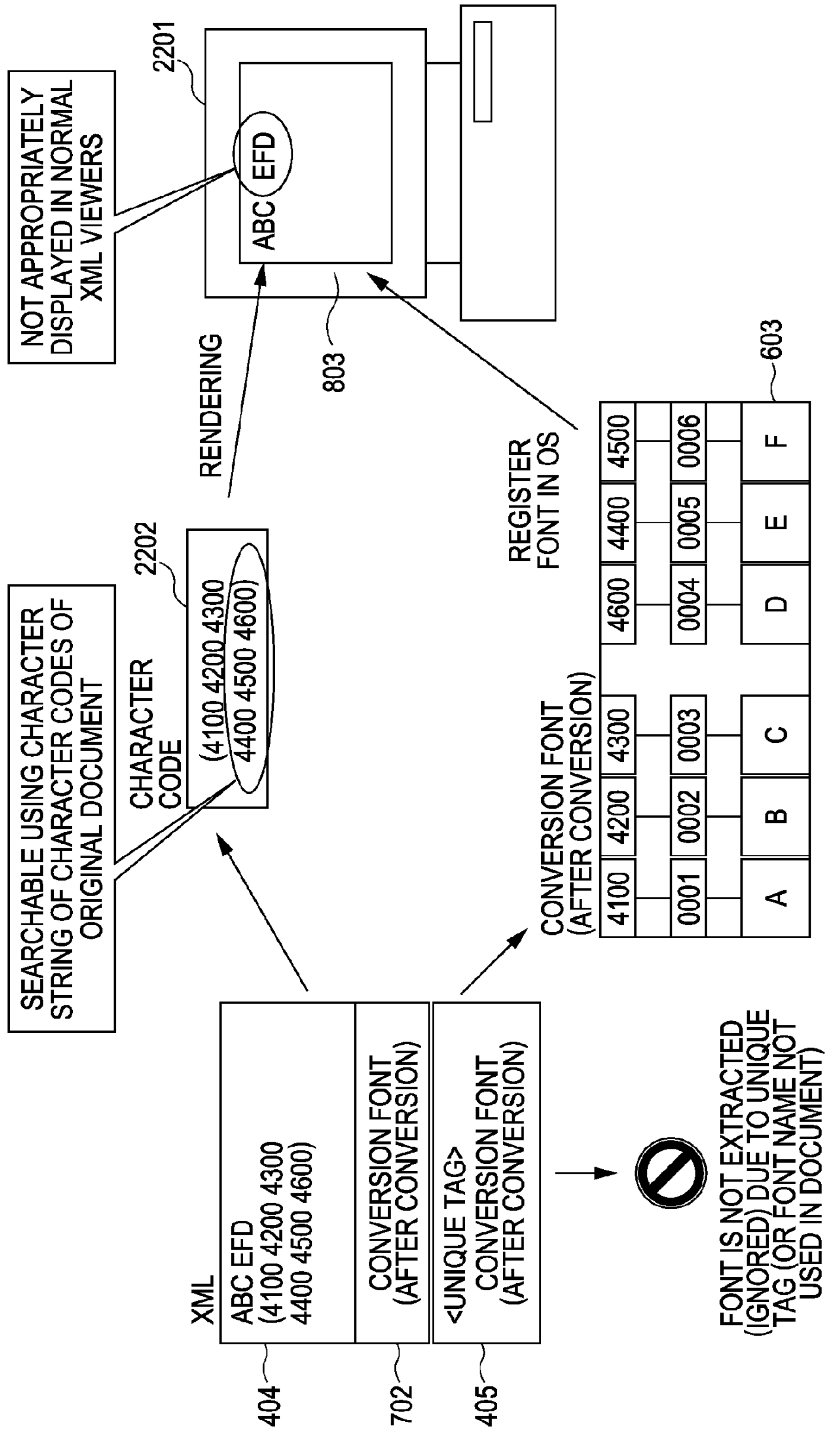
FIG. 19 is a diagram illustrating a further example of the character-rendering processing performed by the terminal apparatus according to the exemplary embodiment.
Figure 22:
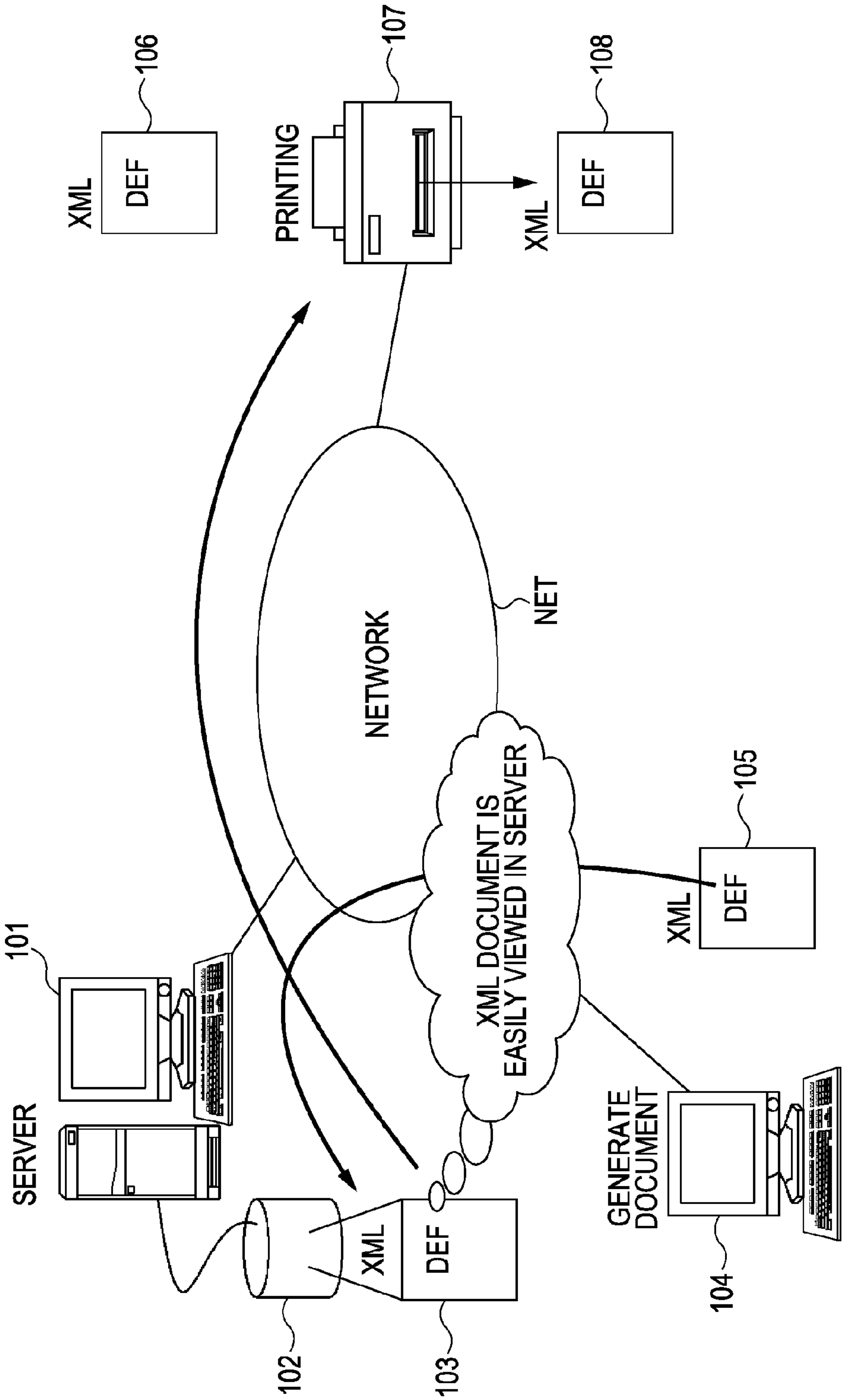
FIG. 22 is a diagram illustrating a configuration of a data processing system in the related art.

FIG. 19 is a diagram illustrating a further example of the character-rendering processing performed by the terminal apparatus according to the exemplary embodiment. In this example, when the third party refers to XML data using the standard XML viewer or the text editor installed in the terminal apparatus, only the text searching is available.

In this example, a conversion font 702 serving as an XML standard font is embedded in XML data 404 shown in FIG. 2, and a pre-conversion font 405 is further embedded using a unique tag in the XML data 404.

After the XML data 404 in which character codes included therein are converted and which includes the font 405 and the conversion font 702 embedded therein is analyzed using the standard XML viewer, a character-code string 2202 and a conversion font 603 are extracted. The extracted conversion font 603 is registered in the OS so as to be ready to be used. Then, a text-rendering instruction is supplied to the OS. The font 405 embedded using the unique tag is not analyzed, that is, ignored.

The character-code string 2202 includes character codes "4400", "4500", and "4600", which are identical to character codes included in original XML data. However, since the conversion font 702 is embedded as the XML standard font, characters of this font corresponding to the character codes "4400", "4500", and "4600" are "E", "F", and "D", respectively.

Accordingly, a character string "EFD" is rendered in a display screen 2201 of a terminal apparatus 803. When the XML data is to be rendered or printed using a dedicated XML viewer or a printer, the font 405 of the unique tag is used, and accordingly, a character string "DEF" which is included in an original document is displayed.

Referring now to memory maps shown in FIGS. 20 and 21, server-readable data processing programs according to this exemplary embodiment will be described.

FIG. 20 is a diagram illustrating a memory map of a storage medium which stores various server-readable data processing programs according to the exemplary embodiment.

FIG. 21 is a diagram illustrating another memory map of the storage medium which stores various terminal-readable data processing programs according to the exemplary embodiment.

Although not shown, information used to manage program groups stored in the storage medium, i.e., version information and information on a creator is also stored in the storage medium. In addition, information which depends on an OS of a program reading side, i.e., information on icons which identify programs may be stored.

Furthermore, data associated with various programs is also stored in a directory of the storage medium. Moreover, programs used to install various programs into a computer, or programs used to decompress compressed programs to be installed may be stored.

The functions described with reference to FIGS. 8 to 19 may be realized by executing programs which are externally installed in a host computer. In this case, the present invention is applicable even in a case where information groups including the programs are supplied to an output apparatus from a CD-ROM (Compact Disc Read-Only Memory), a flash memory, or a FD (Floppy Disk) or are externally supplied to an output apparatus from a storage medium through a network.

As described above, the storage medium including software program code which realizes the functions of the foregoing exemplary embodiments is supplied to a system or an apparatus. It is apparent that an aspect of the invention is realized by reading and executing the program code stored in the storage medium using a computer (CPU or MPU, for example) included in the system or the apparatus.

In this case, the program code read from the storage medium realizes the functions of the present invention, and therefore, the storage medium including the program code is included in the present invention.

Accordingly, forms of the programs are not limited as long as the programs work, and object code, programs executed by an interpreter, and script data to be supplied to the OS, for example, may be employed.

Examples of the storage medium used to supply the programs include a flexible disk, a hard disk, an optical disc, a magneto-optical disc, a CD-ROM, a CD-R (Compact Disc Readable), a CD-RW (Compact Disc Rewritable), a magnetic tap, a nonvolatile memory card, a ROM, and a DVD (Digital Versatile Disc).

In this case, the program code read from the storage medium realizes functions of the present invention, and therefore, the storage medium including the program code is included in the present invention.

The programs may be supplied by accessing a website through the Internet using a browser installed in a client computer and downloading the computer programs or a compressed file having an auto-installation function from the website to a recording medium such as a hard disk. Furthermore, the programs may be supplied by dividing the program code of the programs into a plurality of files, and downloading the plurality of filed from different websites. That is, a WWW server and an ftp server, for example, which allow a plurality of users to download program files which realize the functions of the invention by a computer is also included in the present invention.

Furthermore, the programs may be supplied by delivering the programs of the invention which is encrypted and which is stored in a storage medium such as a CD-ROM to users and allowing users who satisfies a requirement to download key information used to decrypt the encryption from a website. The functions of the foregoing exemplary embodiments may be realized by executing the encrypted programs using the key information so that the programs are installed in a computer.

Furthermore, the functions of the foregoing exemplary embodiments are realized not only by executing the program code read by the computer but also in other ways. For example, an OS, for example, which operates in the computer, performs part of or entire processing in accordance with an instruction of the program code. It is apparent that the present invention includes a case where the functions of the foregoing exemplary embodiments are realized by the processing.

Furthermore, the program code read from the storage medium is written in a memory included in a function expansion board inserted into the computer or a function expansion unit connected to the computer. It is apparent that the present invention includes a case where a CPU included in the function expansion board or the function expansion unit, for example, performs part of or entire processing in accordance with an instruction of the program code and the functions of the foregoing exemplary embodiments are realized by the processing.

The present invention is not limited to the foregoing exemplary embodiments, and various modifications (including organic combination of the foregoing exemplary embodiments) may be made within a spirit of the invention, and are not excluded from a scope of the invention.

Although the various exemplary embodiments of the invention are described, the spirit and scope of the invention are not limited to the specific descriptions in the specification.

According to the exemplary embodiments of the present invention, even when a character string included in structured document data is referred to, a meaningless character string is rendered using a normal rendering function and an appropriate character string is rendered using a special rendering function.

This application claims the benefit of Japanese Patent Application No. 2008-144641 filed Jun. 2, 2008, which is hereby incorporated by reference herein in its entirety.

What is claimed is:

1. An information processing apparatus comprising:

a processor; and a memory coupled to the processor storing instructions that, when executed by the processor, cause the processor to perform operations comprising:

analyzing an electronic document generated using an application and generating first data in a markup language format comprising character codes and a first font specifying a relationship between the character codes and glyphs; and converting the first data into second data in the markup language format, wherein the converting converts the first data to the second data by:

a) generating a second font specifying a relationship between character codes designated to be hidden and the glyphs based on a random code table and rearranging the character codes designated to be hidden so as to be displayed according to the second font with glyphs the same as the glyphs in the electronic document, b) generating a unique tag which is processible by a dedicated application but not processible by a general application and inserting the second font into the unique tag, and c) converting the first data into the second data comprising the rearranged character codes, the first font and the unique tag with the second font inserted; and providing the second data to a terminal device with an application being able to display data in the markup language format, wherein, in a case where the terminal device is equipped with the general application but not equipped with the dedicated application, the second font inserted in the unique tag is not referred and glyphs are identified based on the rearranged character codes according to the first font and when the terminal device is equipped with the dedicated application, glyphs are identified based on the rearranged character codes according to the second font inserted in the unique tag.

2. An information processing method comprising:

analyzing an electronic document generated using an application and generating first data in a markup language format comprising character codes and a first font specifying a relationship between the character codes and glyphs; and converting the first data into second data in the markup language format, wherein the converting converts the first data to the second data by:

a) generating a second font specifying a relationship between character codes designated to be hidden and the glyphs based on a random code table and rearranging the character codes designated to be hidden so as to be displayed according to the second font with glyphs the same as the glyphs in the electronic document, b) generating a unique tag which is processible by a dedicated application but not processible by a general application and inserting the second font into the unique tag, and c) converting the first data into the second data comprising the rearranged character codes, the first font and the unique tag with the second font inserted; and providing the second data to a terminal device with an application being able to display data in the markup language format, wherein, in a case where the terminal device is equipped with the general application but not equipped with the dedicated application, the second font inserted in the unique tag is not referred and glyphs are identified based on the rearranged character codes according to the first font and when the terminal device is equipped with the dedicated application, glyphs are identified based on the rearranged character codes according to the second font inserted in the unique tag.

3. A non-transitory computer readable storage medium storing a computer-executable program of instructions for causing a computer to perform a method comprising:

analyzing an electronic document generated using an application and generating first data in a markup language format comprising character codes and a first font specifying a relationship between the character codes and glyphs; and converting the first data into second data in the markup language format, wherein the converting converts the first data to the second data by:

a) generating a second font specifying a relationship between character codes designated to be hidden and the glyphs based on a random code table and rearranging the character codes designated to be hidden so as to be displayed according to the second font with glyphs the same as the glyphs in the electronic document, b) generating a unique tag which is processible by a dedicated application but not processible by a general application and inserting the second font into the unique tag, and c) converting the first data into the second data comprising the rearranged character codes, the first font and the unique tag with the second font inserted; and providing the second data to a terminal device with an application being able to display data in the markup language format, wherein, in a case where the terminal device is equipped with the general application but not equipped with the dedicated application, the second font inserted in the unique tag is not referred and glyphs are identified based on the rearranged character codes according to the first font and when the terminal device is equipped with the dedicated application, glyphs are identified based on the rearranged character codes according to the second font inserted in the unique tag.

* * * * *